US012348440B2

(12) United States Patent
Liang et al.

(10) Patent No.: US 12,348,440 B2
(45) Date of Patent: Jul. 1, 2025

(54) METHOD AND APPARATUS FOR TRANSMITTING PHYSICAL LAYER PROTOCOL DATA UNIT

(71) Applicant: Huawei Technologies Co., Ltd., Shenzhen (CN)

(72) Inventors: Dandan Liang, Shenzhen (CN); Zhi Gu, Chengdu (CN); Wei Lin, Shenzhen (CN); Ming Gan, Shenzhen (CN); Xianfu Lei, Chengdu (CN); Zhengchun Zhou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 17/744,133

(22) Filed: May 13, 2022

(65) Prior Publication Data

US 2022/0311566 A1 Sep. 29, 2022

Related U.S. Application Data

(63) Continuation of application No. PCT/CN2020/128724, filed on Nov. 13, 2020.

(30) Foreign Application Priority Data

Nov. 15, 2019 (CN) ......................... 201911121641.1
Jan. 15, 2020 (CN) ......................... 202010043533.3

(51) Int. Cl.

| | |
|---|---|
| ***H04L 5/00*** | (2006.01) |
| ***H04W 72/044*** | (2023.01) |
| *H04W 80/02* | (2009.01) |

(52) U.S. Cl.

CPC ......... *H04L 5/0044* (2013.01); *H04W 72/044* (2013.01); *H04W 80/02* (2013.01)

(58) Field of Classification Search

CPC ... H04L 5/0044; H04L 5/0007; H04L 5/0048; H04L 5/005; H04L 25/0226;

(Continued)

(56) References Cited

U.S. PATENT DOCUMENTS 10,159,043 B1 * 12/2018 Cao .................. H04W 52/0229
11,368,269 B2 6/2022 Park et al.

(Continued)

FOREIGN PATENT DOCUMENTS

CN 103138870 A 6/2013
CN 107210987 A 9/2017

(Continued)

OTHER PUBLICATIONS

Asterjadhi, A., "TGbe Nov. 2019 Meeting Agenda," Oct. 8, 2019, doc.: IEEE 802.11-19/1722r11, Qualcomm Inc., Nov. 2019, 100 pages.

(Continued)

*Primary Examiner* — Chi H Pham
*Assistant Examiner* — Vladislav Y Agureyev
(74) *Attorney, Agent, or Firm* — Slater Matsil, LLP

(57) ABSTRACT

This application provides a method and apparatus for transmitting a physical layer protocol data unit, so as to design a long training field sequence for a larger channel bandwidth. The method includes: generating a physical layer protocol data unit PPDU, where the PPDU includes a long training field, a length of a frequency domain sequence of the long training field is greater than a first length, and the first length is a length of a frequency domain sequence of a long training field of a PPDU transmitted over a channel whose bandwidth is 160 MHz; and sending the PPDU over a target channel, where a bandwidth of the target channel is greater than 160 MHz.

4 Claims, 6 Drawing Sheets

(58) Field of Classification Search
CPC ........... H04L 27/2613; H04L 27/26134; H04L 27/262; H04W 72/044; H04W 80/02; H04W 84/12
See application file for complete search history.

(56) References Cited

U.S. PATENT DOCUMENTS

| | | | | |
|---|---|---|---|---|
| 2016/0007325 | A1 | 1/2016 | Seok | |
| 2018/0145811 | A1* | 5/2018 | Park | H04L 69/323 |
| 2018/0184408 | A1* | 6/2018 | Xue | H04L 27/262 |
| 2018/0323919 | A1* | 11/2018 | Sun | H04L 5/0007 |
| 2018/0331876 | A1* | 11/2018 | Lin | H04W 24/10 |
| 2019/0268805 | A1 | 8/2019 | Lee et al. | |
| 2019/0281614 | A1 | 9/2019 | Chen et al. | |
| 2019/0289612 | A1* | 9/2019 | Chen | H04L 27/2613 |
| 2020/0014500 | A1* | 1/2020 | Zhang | H04L 1/20 |
| 2020/0044798 | A1* | 2/2020 | Park | H04L 5/0023 |
| 2020/0100182 | A1* | 3/2020 | Yun | H04W 52/0235 |
| 2020/0145160 | A1* | 5/2020 | Jiang | H04L 5/0048 |
| 2020/0275371 | A1* | 8/2020 | Park | H04L 5/00 |
| 2021/0044389 | A1* | 2/2021 | Kim | H04L 5/0055 |
| 2021/0068197 | A1* | 3/2021 | Kim | H04W 84/12 |
| 2021/0099253 | A1* | 4/2021 | Kim | H04L 1/1607 |
| 2021/0144696 | A1* | 5/2021 | Cariou | H04B 7/0452 |
| 2021/0153248 | A1* | 5/2021 | Jang | H04L 5/0055 |
| 2021/0168868 | A1* | 6/2021 | Jang | H04L 5/0053 |
| 2021/0176643 | A1* | 6/2021 | Jang | H04W 16/10 |
| 2021/0176785 | A1* | 6/2021 | Jang | H04L 1/0068 |
| 2021/0204204 | A1* | 7/2021 | Kim | H04W 48/16 |
| 2021/0204299 | A1* | 7/2021 | Yun | H04W 72/542 |
| 2021/0242998 | A1* | 8/2021 | Park | H04L 5/0092 |
| 2021/0250125 | A1* | 8/2021 | Park | H04L 27/2603 |
| 2021/0258407 | A1* | 8/2021 | Lim | H04W 52/0229 |
| 2021/0274484 | A1* | 9/2021 | Park | H04W 72/0453 |
| 2021/0281376 | A1* | 9/2021 | Park | H04L 5/0044 |
| 2021/0298076 | A1* | 9/2021 | Kim | H04W 84/12 |
| 2021/0307099 | A1* | 9/2021 | Ryu | H04W 76/15 |
| 2021/0320754 | A1* | 10/2021 | Yun | H04L 27/261 |
| 2021/0320830 | A1* | 10/2021 | Park | H04L 27/2618 |
| 2021/0328741 | A1* | 10/2021 | Jang | H04L 27/2666 |
| 2021/0329547 | A1* | 10/2021 | Kim | H04W 52/0229 |
| 2021/0329721 | A1* | 10/2021 | Kim | H04W 76/15 |
| 2021/0336827 | A1* | 10/2021 | Park | H04L 1/0069 |
| 2021/0385006 | A1* | 12/2021 | Ryu | H04L 5/0098 |
| 2022/0038317 | A1* | 2/2022 | Lim | H04L 25/0228 |
| 2022/0045812 | A1* | 2/2022 | Lim | H04L 5/0048 |
| 2022/0053559 | A1* | 2/2022 | Jang | H04W 74/0816 |
| 2022/0061051 | A1* | 2/2022 | Song | H04W 72/0453 |
| 2022/0104257 | A1* | 3/2022 | Ryu | H04W 74/0866 |
| 2022/0110119 | A1* | 4/2022 | Song | H04L 5/001 |
| 2022/0224381 | A1* | 7/2022 | Yun | H04B 7/063 |
| 2022/0271980 | A1* | 8/2022 | Lim | H04W 4/40 |
| 2022/0361170 | A1* | 11/2022 | Park | H04L 27/262 |

FOREIGN PATENT DOCUMENTS

| | | | | |
|---|---|---|---|---|
| CN | 110324268 | A | 10/2019 | |
| EP | 3370378 | A1 * | 9/2018 | H04L 25/02 |
| EP | 3806426 | A1 * | 4/2021 | H04L 1/0023 |
| EP | 3826257 | A1 * | 5/2021 | H04L 27/2603 |
| EP | 3567821 | B1 * | 6/2021 | H04B 7/0695 |
| EP | 3229433 | B1 * | 11/2023 | H04B 7/0452 |
| JP | 2022544933 | A | 10/2022 | |
| WO | WO-2016164912 | A1 * | 10/2016 | H04L 5/0007 |
| WO | WO-2017024130 | A1 * | 2/2017 | H04L 27/262 |
| WO | WO-2018071022 | A1 * | 4/2018 | H04L 1/00 |
| WO | WO-2019045708 | A1 * | 3/2019 | |
| WO | WO-2019132390 | A1 * | 7/2019 | |
| WO | WO-2019132391 | A1 * | 7/2019 | |
| WO | WO-2019146969 | A1 * | 8/2019 | |
| WO | WO-2019177300 | A1 * | 9/2019 | |
| WO | WO-2019178493 | A1 * | 9/2019 | H04L 27/2602 |
| WO | 2019184626 | A1 | 10/2019 | |
| WO | WO-2019235861 | A1 * | 12/2019 | |
| WO | WO-2020027847 | A1 * | 2/2020 | H04W 24/02 |
| WO | 2021230471 | A1 | 11/2021 | |

OTHER PUBLICATIONS

IEEE Standard for Information technology—Telecommunications and information exchange between systems; Local and metropolitan area networks—Specific requirements Part 11: Wireless LAN Medium Access Control (MAC) and Physical Layer (PHY) Specifications, Amendment 4: Enhancements for Very High Throughput for Operation in Bands below 6 GHz, IEEE Computer Society, IEEE Standards Association, IEEE Std. 802.11ac, 2013, 425 pages.

Kim, Jinmin, et al., doc.: IEEE 802.11-19/1925r0, LG electronics, “Consideration of EHT-LTF”, Nov. 11, 2019, total 13 pages.

IEEE P802.11ax/D4.0, Part 11, Amendment1, “Draft Standard for Information technology-Telecommunications and information exchange between systems Local and metropolitan area network-Specific requirements”, Feb. 2019, total 2 pages.

Kim, J. et al., “Consideration of EHT-LTF,” doc: IEEE 802.11-19/1925r0, LG Electronics, Nov. 11, 2019, 13 pages.

* cited by examiner

METHOD AND APPARATUS FOR TRANSMITTING PHYSICAL LAYER PROTOCOL DATA UNIT

CROSS-REFERENCE TO RELATED APPLICATIONS

This application is a continuation of International Application No. PCT/CN2020/128724, filed on Nov. 13, 2020, which claims priority to Chinese Patent Application No. 201911121641.1, filed on Nov. 15, 2019, and Chinese Patent Application No. 202010043533.3, filed on Jan. 15, 2020. All of the aforementioned patent applications are hereby incorporated by reference in their entireties.

TECHNICAL FIELD

This application relates to the field of wireless communications technologies, and more specifically, to a method and apparatus for transmitting a physical layer protocol data unit.

BACKGROUND

With development of the mobile Internet and popularization of intelligent terminals, data traffic grows rapidly, and users impose increasingly high requirements on communications service quality. The Institute of Electrical and Electronics Engineers (IEEE) 802.11ax standard can no longer meet user requirements for a high throughput, a low jitter, a low latency, and the like. Therefore, it is urgent to develop a next-generation wireless local area network (WLAN) technology, that is, the IEEE 802.11be standard.

Different from IEEE 802.11ax, IEEE 802.11be uses ultra-large bandwidths, such as 240 MHz and 320 MHz, to achieve ultra-high transmission rates and support scenarios with an ultra-high user density. Therefore, how to design a long training field (LTF) sequence for a larger channel bandwidth is a problem worth concern.

SUMMARY

This application provides a method and apparatus for transmitting a physical layer protocol data unit, so as to design a long training field sequence for a larger channel bandwidth.

According to a first aspect, a method for transmitting a physical layer protocol data unit is provided, including: generating a physical layer protocol data unit PPDU, where the PPDU includes a long training field, a length of a frequency domain sequence of the long training field is greater than a first length, and the first length is a length of a frequency domain sequence of a long training field of a PPDU transmitted over a channel whose bandwidth is 160 MHz; and sending the PPDU over a target channel, where a bandwidth of the target channel is greater than 160 MHz.

In the method in this embodiment of this application, a long training sequence (also referred to as a frequency domain sequence) that corresponds to a larger channel bandwidth can be designed, to enable a receive end to transmit data on a larger channel bandwidth. The long training sequence may be obtained based on the long training sequence of the existing channel bandwidth, and a long training sequence with good performance may be obtained through simulation calculation, for example, parameter adjustment. A long training field may be obtained based on the long training sequence. According to this embodiment of this application, a larger channel bandwidth can be met in practice. Further, the long training sequence provided in this embodiment of this application is verified by performing enumerated simulation on parameters. A peak-to-average power ratio PAPR is relatively low and performance is relatively good, thereby improving spectrum utilization of a system.

With reference to the first aspect, in some implementations of the first aspect, the bandwidth of the target channel is 240 MHz, a transmission mode is a 4x mode, and the frequency domain sequence of the long training field is any one of the following: {HE-LTF80 MHz_4x, $0_{23}$, HE-LTF80 MHz_4x', $0_{23}$, −HE-LTF80 MHz_4x}; or {−HE-LTF80 MHz_4x, $0_{23}$, −HE-LTF80 MHz_4x', $0_{23}$, HE-LTF80 MHz_4x}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a specific embodiment part.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

With reference to the first aspect, in some implementations of the first aspect, the bandwidth of the target channel is 320 MHz, a transmission mode is a 4x mode, and the frequency domain sequence of the long training field is any one of the following: {HE-LTF80 MHz_4x, $0_{23}$, −HE-LTF80 MHz_4x', $0_{23}$, HE-LTF80 MHz_4x, $0_{23}$, HE-LTF80 MHz_4x'}; or {−HE-LTF80 MHz_4x, $0_{23}$, HE-LTF80 MHz_4x', $0_{23}$, −HE-LTF80 MHz_4x, $0_{23}$, −HE-LTF80 MHz_4x'}; or {HE-LTF80 MHz_4x, $0_{23}$, HE-LTF80 MHz_4x', $0_{23}$, HE-LTF80 MHz_4x, $0_{23}$, −HE-LTF80 MHz_4x'}; or {−HE-LTF80 MHz_4x, $0_{23}$, −HE-LTF80 MHz_4x', $0_{23}$, −HE-LTF80 MHz_4x, $0_{23}$, HE-LTF80 MHz_4x'}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a specific embodiment part.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

With reference to the first aspect, in some implementations of the first aspect, the bandwidth of the target channel is 240 MHz, a transmission mode is a 1x mode, and the frequency domain sequence of the long training field is {HE-LTF80 MHz_1x, $0_{23}$, HE-LTF80 MHz_1x, $0_{23}$, −HE-LTF80 MHz_1x}. For HE-LTF80 MHz_1x, refer to a specific embodiment part. $0_{23}$ represents 23 consecutive 0s.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

With reference to the first aspect, in some implementations of the first aspect, the bandwidth of the target channel is 320 MHz, a transmission mode is a 1x mode, and the frequency domain sequence of the long training field is any one of the following: {HE-LTF80 MHz_1x, $0_{23}$, HE-LTF80 MHz_1x, $0_{23}$, HE-LTF80 MHz_1x, $0_{23}$, −HE-LTF80 MHz_1x}; or {−HE-LTF80 MHz_1x, $0_{23}$, −HE-LTF80 MHz_1x, $0_{23}$, −HE-LTF80 MHz_1x, $0_{23}$, HE-LTF80 MHz_1x}. For HE-LTF80 MHz_1x, refer to a specific embodiment part. $0_{23}$ represents 23 consecutive 0s.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

With reference to the first aspect, in some implementations of the first aspect, the bandwidth of the target channel is 240 MHz, a transmission mode is a 2x mode, and the frequency domain sequence of the long training field is any one of the following: {HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}; or {−HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a specific embodiment part.

With reference to the first aspect, in some implementations of the first aspect, the bandwidth of the target channel is 240 MHz, a transmission mode is a 2x mode, and the frequency domain sequence of the long training field is any one of the following: {HE-LTF80 MHz_2x, $0_{23}$, −HE-LTF160 MHz_2x}; or {−HE-LTF80 MHz_2x, $0_{23}$, HE-LTF160 MHz_2x}; or {HE-LTF160 MHz_2x, $0_{23}$, −HE-LTF80 MHz_2x}; or {−HE-LTF160 MHz_2x, $0_{23}$, HE-LTF80 MHz_2x}; or {HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, −HE-LTF80 MHz_2x}. $0_{23}$ represents 23 consecutive 0s. For HE-LTF80 MHz_2x and HE-LTF160 MHz_2x, refer to a method embodiment part.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

With reference to the first aspect, in some implementations of the first aspect, the bandwidth of the target channel is 320 MHz, a transmission mode is a 2x mode, and the frequency domain sequence of the long training field is any one of the following: {HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$}; or {−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a specific embodiment part.

With reference to the first aspect, in some implementations of the first aspect, the bandwidth of the target channel is 320 MHz, a transmission mode is a 2x mode, and the frequency domain sequence of the long training field is any one of the following: {HE-LTF160 MHz_2x, $0_{23}$, −HE-LTF160 MHz_2x}; or {−HE-LTF160 MHz_2x, $0_{23}$, HE-LTF160 MHz_2x}; or {HE-LTF160 MHz_2x, $0_{23}$, HE-LTF160 MHz_2x}; or {−HE-LTF160 MHz_2x, $0_{23}$, −HE-LTF160 MHz_2x}; or {HE-LTF80 MHz_2x, $0_{23}$, −HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, HE-LTF80 MHz_2x, $0_{23}$, −HE-LTF80 MHz_2x}; or {HE-LTF80 MHz_2x, $0_{23}$, HE-LTF80 MHz_2x, $0_{23}$, −HE-LTF80 MHz_2x, $0_{23}$, −HE-LTF80 MHz_2x}; or {−HE-LTF80 MHz_2x, $0_{23}$, −HE-LTF80 MHz_2x, $0_{23}$, HE-LTF80 MHz_2x, $0_{23}$, HE-LTF80 MHz_2x}. $0_{23}$ represents 23 consecutive 0s. For HE-LTF80 MHz_2x and HE-LTF160 MHz_2x, refer to a method embodiment part.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

According to a second aspect, another method for transmitting a physical layer protocol data unit is provided, including: receiving a physical layer protocol data unit PPDU over a target channel, where the PPDU includes a long training field, a length of a frequency domain sequence of the long training field is greater than a first length, the first length is a length of a frequency domain sequence of a long training field of a PPDU transmitted over a channel whose bandwidth is 160 MHz, and a bandwidth of the target channel is greater than 160 MHz; and parsing the PPDU.

With reference to the second aspect, in some implementations of the second aspect, the bandwidth of the target channel is 240 MHz, a transmission mode is a 4x mode, and the frequency domain sequence of the long training field is any one of the following: {HE-LTF80 MHz_4x, $0_{23}$, HE-LTF80 MHz_4x', $0_{23}$, −HE-LTF80 MHz_4x}; or {−HE-LTF80 MHz_4x, $0_{23}$, −HE-LTF80 MHz_4x', $0_{23}$, HE-LTF80 MHz_4x}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a specific embodiment part.

With reference to the second aspect, in some implementations of the second aspect, the bandwidth of the target channel is 320 MHz, a transmission mode is a 4x mode, and the frequency domain sequence of the long training field is any one of the following: {HE-LTF80 MHz_4x, $0_{23}$, −HE- LTF80 MHz_4x', $0_{23}$, HE-LTF80 MHz_4x, $0_{23}$, HE-LTF80 MHz_4x'}; or {−HE-LTF80 MHz_4x, $0_{23}$, HE-LTF80 MHz_4x', $0_{23}$, −HE-LTF80 MHz_4x, $0_{23}$, −HE-LTF80 MHz_4x'}; or {HE-LTF80 MHz_4x, $0_{23}$, HE-LTF80 MHz_4x', $0_{23}$, HE-LTF80 MHz_4x, $0_{23}$, −HE-LTF80 MHz_4x'}; or {−HE-LTF80 MHz_4x, $0_{23}$, −HE-LTF80 MHz_4x', $0_{23}$, −HE-LTF80 MHz_4x, $0_{23}$, HE-LTF80 MHz_4x'}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a specific embodiment part.

With reference to the second aspect, in some implementations of the second aspect, the bandwidth of the target channel is 240 MHz, a transmission mode is a 1x mode, and the frequency domain sequence of the long training field is {HE-LTF80 MHz_1x, $0_{23}$, HE-LTF80 MHz_1x, $0_{23}$, −HE-LTF80 MHz_1x}. For HE-LTF80 MHz_1x, refer to a specific embodiment part. $0_{23}$ represents 23 consecutive 0s.

With reference to the second aspect, in some implementations of the second aspect, the bandwidth of the target channel is 320 MHz, a transmission mode is a 1x mode, and the frequency domain sequence of the long training field is any one of the following: {HE-LTF80 MHz_1x, $0_{23}$, HE-LTF80 MHz_1x, $0_{23}$, HE-LTF80 MHz_1x, $0_{23}$, −HE-LTF80 MHz_1x}; or {−HE-LTF80 MHz_1x, $0_{23}$, −HE-LTF80 MHz_1x, $0_{23}$, −HE-LTF80 MHz_1x, $0_{23}$, HE-LTF80 MHz_1x}. For HE-LTF80 MHz_1x, refer to a specific embodiment part. $0_{23}$ represents 23 consecutive 0s.

With reference to the second aspect, in some implementations of the second aspect, the bandwidth of the target channel is 240 MHz, a transmission mode is a 2x mode, and the frequency domain sequence of the long training field is any one of the following: {HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}; or {−HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a specific embodiment part.

With reference to the second aspect, in some implementations of the second aspect, the bandwidth of the target channel is 240 MHz, a transmission mode is a 2x mode, and the frequency domain sequence of the long training field is any one of the following: {HE-LTF80 MHz_2x, $0_{23}$, −HE-LTF160 MHz_2x}; or {−HE-LTF80 MHz_2x, $0_{23}$, HE-LTF160 MHz_2x}; or {HE-LTF160 MHz_2x, $0_{23}$, −HE-LTF80 MHz_2x}; or {−HE-LTF160 MHz_2x, $0_{23}$, HE-LTF80 MHz_2x}; or {HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, −HE-LTF80 MHz_2x}. $0_{23}$ represents 23 consecutive 0s. For HE-LTF80 MHz_2x and HE-LTF160 MHz_2x, refer to a method embodiment part.

With reference to the second aspect, in some implementations of the second aspect, the bandwidth of the target channel is 320 MHz, a transmission mode is a 2x mode, and the frequency domain sequence of the long training field is any one of the following: {HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$}; or {−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a specific embodiment part.

With reference to the second aspect, in some implementations of the second aspect, the bandwidth of the target channel is 320 MHz, a transmission mode is a 2x mode, and the frequency domain sequence of the long training field is any one of the following: {HE-LTF160 MHz_2x, $0_{23}$, −HE-LTF160 MHz_2x}; or {−HE-LTF160 MHz_2x, $0_{23}$, HE-LTF160 MHz_2x}; or {HE-LTF160 MHz_2x, $0_{23}$, HE-LTF160 MHz_2x}; or {−HE-LTF160 MHz_2x, $0_{23}$, −HE-LTF160 MHz_2x}; or {HE-LTF80 MHz_2x, $0_{23}$, −HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, HE-LTF80 MHz_2x, $0_{23}$, −HE-LTF80 MHz_2x}; or {HE-LTF80 MHz_2x, $0_{23}$, −HE-LTF80 MHz_2x, $0_{23}$, −HE-LTF80 MHz_2x, $0_{23}$, −HE-LTF80 MHz_2x}; or {−HE-LTF80 MHz_2x, $0_{23}$, −HE-LTF80 MHz_2x, $0_{23}$, HE-LTF80 MHz_2x, $0_{23}$, HE-LTF80 MHz_2x}. $0_{23}$ represents 23 consecutive 0s. For HE-LTF80 MHz_2x and HE-LTF160 MHz_2x, refer to a method embodiment part.

According to a third aspect, an apparatus for transmitting a physical layer protocol data unit is provided. The apparatus is configured to perform the method provided in the first aspect. Specifically, the apparatus may include modules configured to perform any one of the first aspect or the possible implementations of the first aspect.

According to a fourth aspect, an apparatus for receiving a physical layer protocol data unit is provided. The apparatus is configured to perform the method provided in the second aspect. Specifically, the apparatus may include modules configured to perform any one of the second aspect or the possible implementations of the second aspect.

According to a fifth aspect, an apparatus for transmitting a physical layer protocol data unit is provided, including a processor. The processor is coupled to a memory, and may be configured to execute instructions in the memory, to implement the method in any one of the first aspect or the possible implementations of the first aspect. Optionally, the apparatus further includes the memory. Optionally, the apparatus further includes a communications interface, and the processor is coupled to the communications interface.

In an implementation, the apparatus is an access point. When the apparatus is the access point, the communications interface may be a transceiver or an input/output interface.

In another implementation, the apparatus is a chip configured in the access point. When the apparatus is the chip configured in the access point, the communications interface may be an input/output interface.

In an implementation, the apparatus is a station. When the apparatus is the station, the communications interface may be a transceiver or an input/output interface.

In another implementation, the apparatus is a chip configured in a station. When the apparatus is the chip configured in the station, the communications interface may be an input/output interface.

In another implementation, the apparatus is a chip or a chip system.

Optionally, the transceiver may be a transceiver circuit. Optionally, the input/output interface may be an input/output circuit.

According to a sixth aspect, an apparatus for transmitting a physical layer protocol data unit is provided, including a processor. The processor is coupled to a memory, and may be configured to execute instructions in the memory, to implement the method according to any one of the second aspect and the possible implementations of the second aspect. Optionally, the apparatus further includes the memory. Optionally, the apparatus further includes a communications interface, and the processor is coupled to the communications interface.

In an implementation, the apparatus is an access point. When the apparatus is the access point, the communications interface may be a transceiver or an input/output interface.

In another implementation, the apparatus is a chip configured in the access point. When the apparatus is the chip configured in the access point, the communications interface may be an input/output interface.

In an implementation, the apparatus is a station. When the apparatus is the station, the communications interface may be a transceiver or an input/output interface.

In another implementation, the apparatus is a chip configured in a station. When the apparatus is the chip configured in the station, the communications interface may be an input/output interface.

In another implementation, the apparatus is a chip or a chip system.

Optionally, the transceiver may be a transceiver circuit. Optionally, the input/output interface may be an input/output circuit.

According to a seventh aspect, a computer-readable storage medium is provided. The computer-readable storage medium stores a computer program. When the computer program is executed by an apparatus, the apparatus is enabled to implement the method according to any one of the first aspect or the possible implementations of the first aspect.

According to an eighth aspect, a computer-readable storage medium is provided. The computer-readable storage medium stores a computer program. When the computer program is executed by an apparatus, the apparatus is enabled to implement the method according to any one of the second aspect or the possible implementations of the second aspect.

According to a ninth aspect, a computer program product including instructions is provided. When the instructions are executed by a computer, an apparatus is enabled to implement the method according to any one of the first aspect or the possible implementations of the first aspect.

According to a tenth aspect, a computer program product including instructions is provided. When the instructions are executed by a computer, an apparatus is enabled to implement the method according to any one of the second aspect or the possible implementations of the second aspect.

According to an eleventh aspect, a communications system is provided, including the access point and the station described above.

DETAILED DESCRIPTION OF ILLUSTRATIVE EMBODIMENTS

The following describes technical solutions in this application with reference to accompanying drawings.

The technical solutions of embodiments of this application may be applied to various communications systems, such as: a wireless local area network (WLAN) communications system, a global system for mobile communications (global system of mobile communication, GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (uUMTS), a worldwide interoperability for microwave access (WiMAX) communications system, a subsequent 5th generation (5G) system, or new radio (NR).

The following is used as an example for description. Only the WLAN system is used as an example below to describe an application scenario in the embodiments of this application and a method in embodiments of this application.

Specifically, embodiments of this application may be applied to a wireless local area network (WLAN), and embodiments of this application may be applied to any protocol in the institute of electrical and electronics engineers (IEEE) 802.11 series protocols currently used in the WLAN. The WLAN may include one or more basic service sets (BSS). A network node in the basic service set includes an access point (AP) and a station (STA).

Specifically, in the embodiments of this application, an initiating device and a responding device may be user stations (STA) in the WLAN. The user station may also be referred to as a system, a subscriber unit, an access terminal, a mobile station, a mobile console, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communications function, a wearable device, a computing device, or another processing device connected to a wireless modem.

In addition, the initiating device and the responding device each in the embodiments of this application may alternatively be an AP in the WLAN. The AP may be configured to: communicate with an access terminal through the wireless local area network, and transmit data of the access terminal to a network side, or transmit data from a network side to the access terminal.

Figure 1:
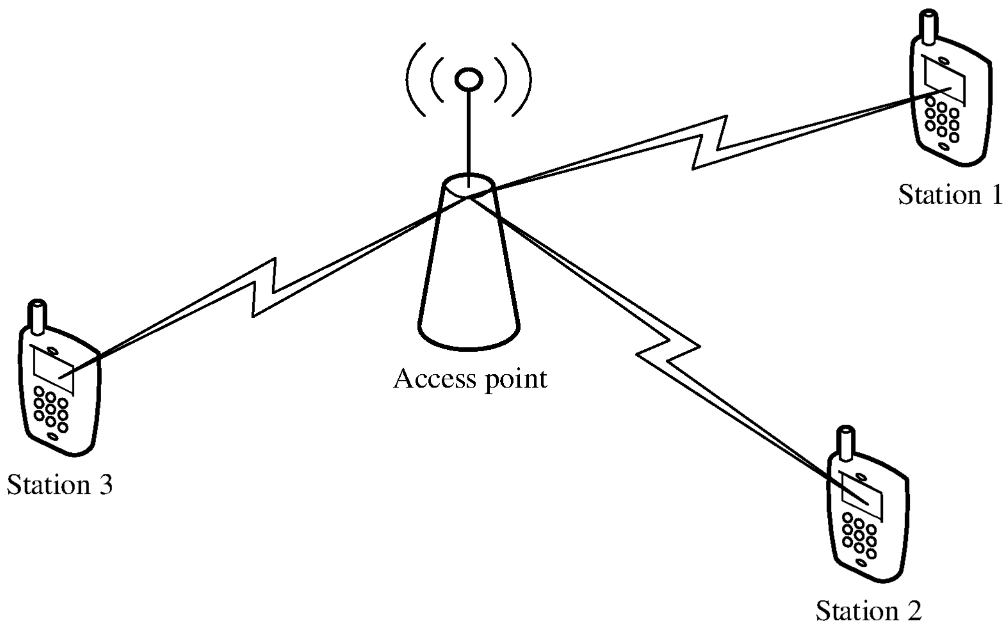
FIG. 1 is a schematic diagram of a communications system applicable to a method according to an embodiment of this application.

For ease of understanding of the embodiments of this application, a communications system shown in FIG. 1 is first used as an example to describe in detail a communications system to which embodiments of this application are applicable. A scenario system shown in FIG. 1 may be a WLAN system. The WLAN system in FIG. 1 may include one or more APs and one or more STAs. In FIG. 1, one AP and three STAs are used as an example. Wireless communications may be performed between the AP and each of the STAs according to various standards. For example, wireless communications between the AP and the STA may be performed by using a single-user multiple-input multiple-output (SU-MIMO) technology or a multi-user multiple-input multiple-output (MU-MIMO) technology.

Figure 2:
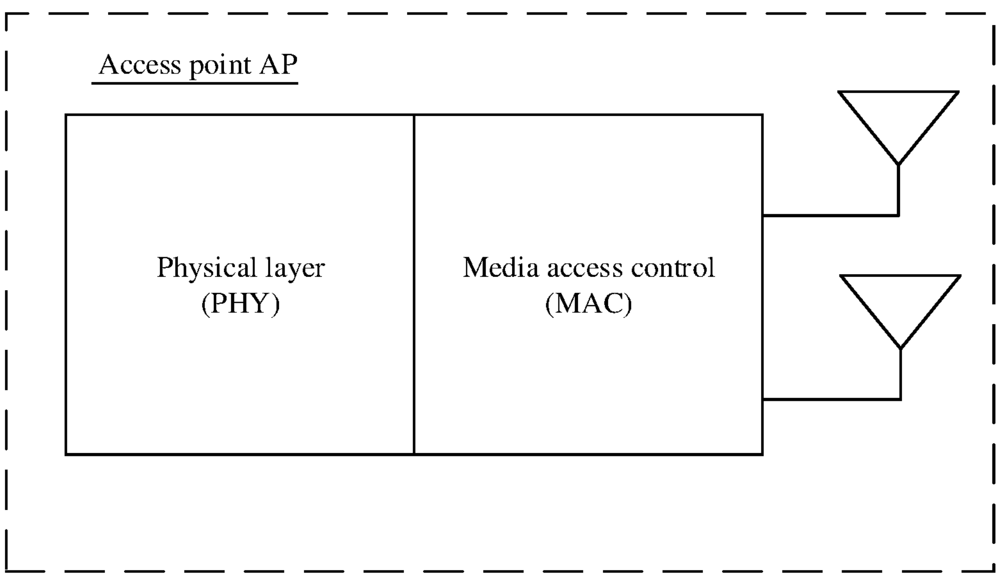
FIG. 2 is a diagram of an internal structure of an access point applicable to an embodiment of this application.

The AP is also referred to as a wireless access point, a hotspot, or the like. APs are access points for mobile users to access wired networks, and are mainly deployed in homes, buildings, and campuses, or are deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports a plurality of WLAN standards such as 802.11. FIG. 2 shows an internal structural diagram of an AP product. The AP may have a plurality of antennas or may have a single antenna. In FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on a PHY and MAC part, and this embodiment of this application focuses on protocol design on the MAC and the PHY.

Figure 3:
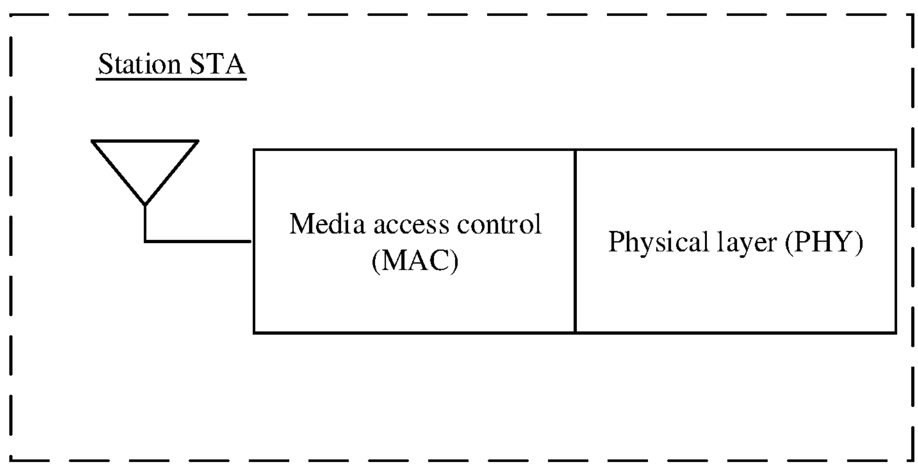
FIG. 3 is an internal structural diagram of a station applicable to an embodiment of this application.

A STA product is usually a terminal product, for example, a mobile phone, a notebook computer, or the like, that supports the 802.11 series standards. FIG. 3 shows a diagram of a structure of a STA with a single antenna. In an actual scenario, the STA may alternatively have a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

With development of the mobile Internet and popularization of intelligent terminals, data traffic grows rapidly, and users impose increasingly high requirements on communications service quality. The Institute of Electrical and Electronics Engineers (IEEE) 802.11ax standard can no longer meet user requirements for a high throughput, a low jitter, a low latency, and the like. Therefore, it is urgent to develop a next-generation wireless local area network (WLAN) technology, that is, the IEEE 802.11be standard. IEEE 802.11be inherits an orthogonal frequency division multiple access (OFDMA) technology used in IEEE 802.11ax. The OFDMA technology is developed on the basis of an orthogonal frequency division multiplexing (OFDM) technology, and is a technology that is obtained by combining the OFDM technology and a frequency division multiple access (FDMA) technology and that is applicable to multi-user access. Owing to its simple implementation and high spectrum utilization, this technology has been adopted by international standards such as LTE and 5G. The OFDMA technology divides a physical channel into a plurality of resource blocks. Each resource block includes a plurality of subcarriers (sub-channels). Each user may occupy one resource block for data transmission. Therefore, a plurality of users can perform transmission in parallel. This reduces time overheads and a collision probability of contention-based access performed by the plurality of users. In the OFDMA technology, because subcarriers overlap each other, spectrum utilization is greatly improved.

Different from IEEE 802.11ax, IEEE 802.11be uses ultra-large bandwidths, such as 240 MHz and 320 MHz, to achieve ultra-high transmission rates and support scenarios with an ultra-high user density. The IEEE 802.11ax standard supports a maximum bandwidth of 160 MHz. Therefore, a new long training field sequence needs to be designed for a larger channel bandwidth. In view of this, embodiments of this application provide a method and apparatus for transmitting a physical layer protocol data unit, so as to design a long training field sequence for a larger channel bandwidth.

To facilitate understanding of embodiments of this application, the following briefly describes nouns or terms in this application.

1. Subcarrier

Wireless communications signals have limited bandwidths. A bandwidth may be divided, by using the OFDM technology, into a plurality of frequency components within a channel bandwidth at a specific frequency interval. These components are referred to as subcarriers.

2. Resource Block Distribution (Tone Plan)

Figure 4:
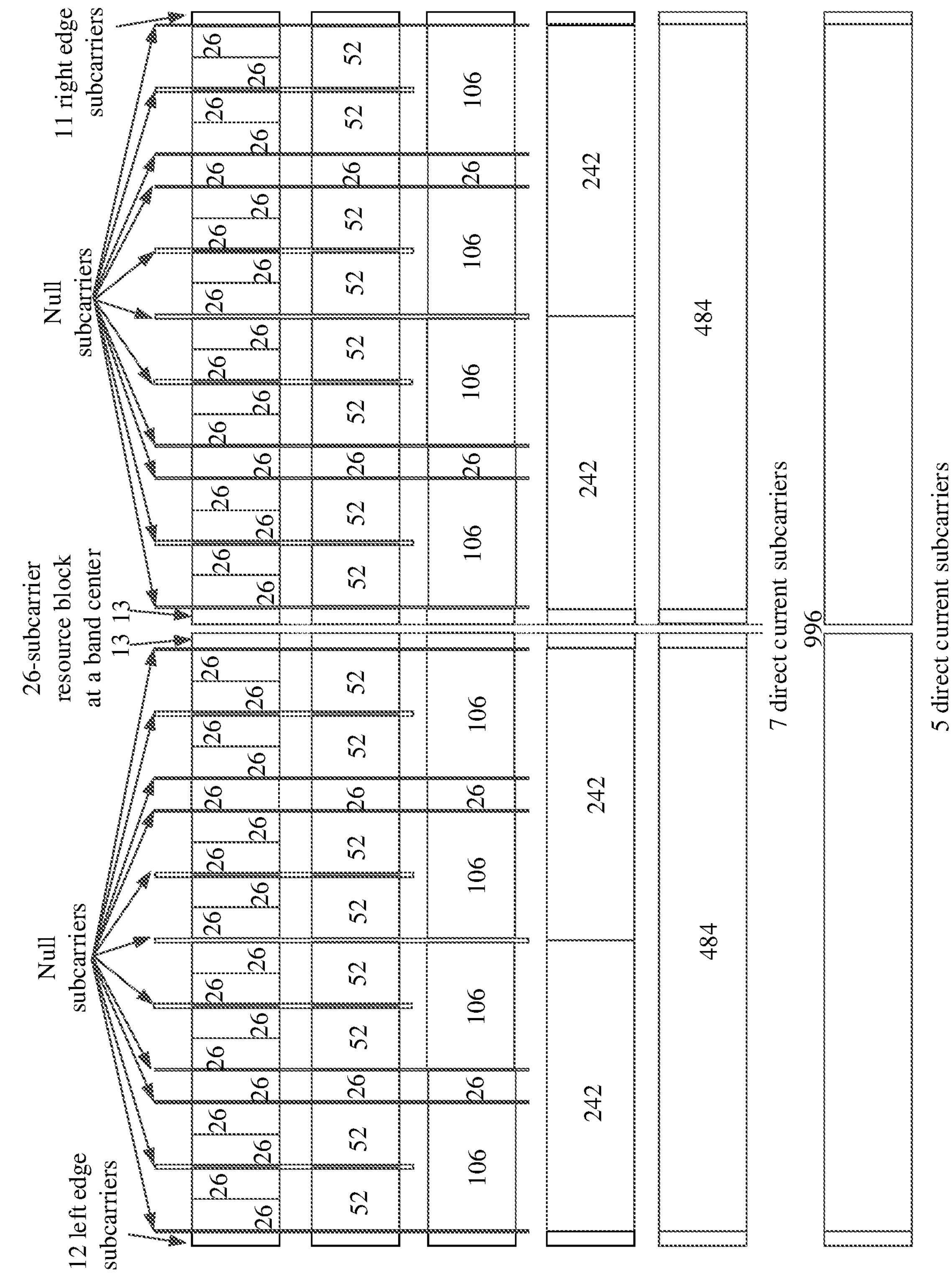
FIG. 4 is a schematic diagram of OFDMA resource block distribution in an 80 MHz bandwidth.

Resource block distribution may also be understood as distribution of subcarriers for carrying data, and different channel bandwidths may correspond to different tone plans. When OFDMA and multi-user multiple-input multiple-output (MU-MIMO) technologies are applied, an AP divides a spectrum bandwidth into several resource units (RUs). As specified in the IEEE 802.11ax protocol, spectrum bandwidths of 20 MHz, 40 MHz, 80 MHz, and 160 MHz are divided into a plurality of types of resource blocks, including a 26-subcarrier resource block, a 52-subcarrier resource block, a 106-subcarrier resource block, a 242-subcarrier resource block (a largest resource block in the 20 MHz bandwidth), a 484-subcarrier resource block (a largest resource block in the 40 MHz bandwidth), a 996-subcarrier resource block (a largest resource block in the 80 MHz bandwidth), and a 1992-subcarrier resource block (a largest resource block in the 160 MHz bandwidth). Each RU includes consecutive subcarriers. For example, the 26-subcarrier resource block includes 26 consecutive subcarrier. It should be noted that RUs that can be supported by different spectrum bandwidths have different types and quantities, but in a same bandwidth, hybrid-type resource units can be supported. FIG. 4 is a schematic diagram of an example of a tone plan in the 80 MHz bandwidth. Left edge subcarriers and right edge subcarriers are located at edges of a transmission band, and serve as guard subcarriers to mitigate impact of transmission filtering on data and pilot subcarriers. Direct current subcarriers are subcarriers with empty content (that is, subcarriers that do not carry data or information). A mobile device uses a direct current subcarrier to locate a center of an OFDM band. Null subcarriers are subcarriers to which no information is allocated. The left edge subcarriers, the right edge subcarriers, the direct current subcarriers, and the null subcarriers may be collectively referred to as leftover subcarriers (leftover tones) between RUs. A quantity of subcarriers in a large RU is the same as a sum of a quantity of subcarriers corresponding to a plurality of small RUs accommodated in the large RU and a quantity of leftover subcarriers between the small RUs.

In an OFDMA system, a multi-user data packet is implemented by combining RUs in a plurality of sizes. An AP allocates one RU to each user. The following several optional RUs may be allocated to users:

(1) An RU Including 26 Contiguous Subcarriers: 24 Data Subcarriers and 2 Pilot Subcarriers;

(2) an RU including 52 contiguous subcarriers: 48 data subcarriers and 4 pilot subcarriers;

(3) an RU including 106 contiguous subcarriers: 102 data subcarriers and 4 pilot subcarriers;

(4) an RU including 242 contiguous subcarriers: 234 data subcarriers and 8 pilot subcarriers;

(5) an RU including 484 contiguous subcarriers: 468 data subcarriers and 16 pilot subcarriers; and (6) an RU including 996 contiguous subcarriers: 980 data subcarriers and 16 pilot subcarriers.

The 484-RU is used in 40 MHz multi-user transmission, and the 996-RU is used in 80 MHz or 160 MHz multi-user transmission. It should be understood that, a 160 MHz tone plan may be considered as including two 80 MHz tone plans. A 240 MHz tone plan may be considered as including three 80 MHz tone plans. A 320 MHz tone plan may be considered as including four 80 MHz tone plans. Details are not described herein.

Based on the foregoing tone plans, transmission modes of an HE-LTF sequence used for channel estimation in the IEEE 802.11ax standard may be classified into three modes: 1x, 2x, and 4x. In the 4x mode, a subcarrier number of a subcarrier mapped to an HE-LTF sequence is the same as a serial number of the subcarrier in a tone plan for a data part. In the 2x mode, an HE-LTF sequence number corresponds to a 4x HE-LTF serial number divided by 2, that is, a subcarrier number of a subcarrier mapped to an HE-LTF sequence is equal to a half of a serial number of the subcarrier in a tone plan for a data part. In the 1x mode, an HE-LTF sequence number corresponds to a 4x HE-LTF serial number divided by 4, that is, a subcarrier number of a subcarrier mapped to an HE-LTF sequence is equal to a quarter of a serial number of the subcarrier in a tone plan for a data part.

3. Long Training Field Sequence

A long training field (LTF) sequence is a frequency domain sequence of a long training field, and may also be referred to as a long training sequence for short. An LTF sequence is mainly used for accurate frequency deviation estimation and channel estimation. Different LTF sequences may be defined for different maximum channel bandwidths. For example, a high efficiency long training field (HE-LTF) sequence defined in IEEE 802.11ax supports a maximum channel bandwidth of 160 MHz. This application focuses on a channel bandwidth greater than 160 MHz. Therefore, for ease of differentiation, an LTF sequence in a larger bandwidth supported by IEEE 802.11be is referred to as an extremely high throughput long training field (extremely high throughput-LTF, EHT-LTF) in the embodiments of this application. It should be understood that, the EHT-LTF is used to indicate a long training field in a bandwidth greater than 160 MHz supported in a next-generation WLAN technology. A specific name of the EHT-LTF sets no limitation on the protection scope of the embodiments of this application.

An HE-LTF sequence in the IEEE 802.11ax standard may be designed as follows based on different modes:

(i) 1x Mode

In this application, an HE-LTF sequence in the 20 MHz channel bandwidth and the 1x mode is denoted as HE-LTF20 MHz_1x; an HE-LTF sequence in the 40 MHz channel bandwidth and the 1x mode is denoted as HE-LTF40 MHz_1x; an HE-LTF sequence in the 80 MHz channel bandwidth and the 1x mode is denoted as HE-LTF80 MHz_1x; and an HE-LTF sequence in the 160 MHz channel bandwidth and the 1x mode is denoted as HE-LTF160 MHz_1x.

HE-LTF20 MHz_1x={0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, 0, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0};

HE-LTF40 MHz_1x={+1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, 0, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1};

HE-LTF80 MHz_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1};

HE-LTF160 MHz_1x={HE-LTF80 MHz_lower_1x, 0, 0, 0, 0, 0, 0, 0, 0, 0, 0, 0, 0, 0, 0, 0, 0, 0, 0, 0, 0, 0, 0, 0, HE-LTF80 MHz_upper_1x};

HE-LTF80 MHz_lower_1x={HE-LTF80 MHz_left_1x, 0, HE-LTF80 MHz_right_1x};

HE-LTF80 MHz_upper_1x={HE-LTF80 MHz_left_1x, 0, −HE-LTF80 MHz_right_1x};

HE-LTF80 MHz_left_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0}; and HE-LTF80 MHz_right_1x={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

(2) 2x Mode

In this application, an HE-LTF sequence in the 20 MHz channel bandwidth and the 2x mode is denoted as HE-LTF20 MHz_2x; an HE-LTF sequence in the 40 MHz channel bandwidth and the 2x mode is denoted as HE-LTF40 MHz_2x; an HE-LTF sequence in the 80 MHz channel bandwidth and the 2x mode is denoted as HE-LTF80 MHz_2x; and an HE-LTF sequence in the 160 MHz channel bandwidth and the 2x mode is denoted as HE-LTF160 MHz_2x.

HE-LTF20 MHz_2x={−1, 0, −1, 0, −1, 0, +1, 0, +1, 0, −1, 0, +1, 0, −1, 0, −1, 0, −1, 0, −1, 0, +1, 0, −1, 0, +1, 0, −1, 0, −1, 0, +1, 0, +1, 0, −1, 0, +1, 0, +1, 0, +1, 0, +1, 0, +1, 0, −1, 0, +1, 0, −1, 0, +1, 0, −1, 0, −1, 0, +1, 0, +1, 0, −1, 0, +1, 0, −1, 0, −1, 0, −1, 0, −1, 0, +1, 0, −1, 0, +1, 0, +1, 0, +1, 0, −1, 0, −1, 0, +1, 0, −1, 0, −1, 0, −1, 0, −1, 0, −1, 0, +1, 0, −1, 0, −1, 0, −1, 0, +1, 0, +1, 0, +1, 0, −1, 0, −1, 0, +1, 0, 0, 0, +1, 0, −1, 0, +1, 0, +1, 0, −1, 0, +1, 0, +1, 0, −1, 0, +1, 0, +1, 0, −1, 0, −1, 0, +1, 0, −1, 0, +1, 0, +1, 0, +1, 0, +1, 0, −1, 0, +1, 0, −1, 0, +1, 0, +1, 0, −1, 0, −1, 0, +1, 0, −1, 0, −1, 0, −1, 0, −1, 0, −1, 0, +1, 0, −1, 0, +1, 0, +1, 0, −1, 0, −1, 0, +1, 0, +1, 0, −1, 0, +1, 0, −1, 0, −1, 0,

−1, 0, −1, 0, +1, 0, −1, 0, +1, 0, +1, 0, +1, 0, −1, 0, −1, 0, +1, 0, −1, 0, −1, 0, −1, 0, −1, 0, −1, 0, +1, 0, −1, 0, +1};

HE-LTF40 MHz_2x={+1, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, −1, 0, −1, 0, +1, 0, +1, 0, +1, 0, +1, 0, −1, 0, +1, 0, −1, 0, +1, 0, +1, 0, −1, 0, −1, 0, −1, 0, −1, 0, −1, 0, +1, 0, +1, 0, −1, 0, −1, 0, +1, 0, −1, 0, +1, 0, −1, 0, +1, 0, +1, 0, +1, 0, +1, 0, +1, 0, −1, 0, −1, 0, −1, 0, −1, 0, +1, 0, −1, 0, +1, 0, −1, 0, +1, 0, +1, 0, +1, 0, +1, 0, +1, 0, −1, 0, +1, 0, −1, 0, −1, 0, +1, 0, −1, 0, +1, 0, −1, 0, −1, 0, +1, 0, +1, 0, +1, 0, +1, 0, +1, 0, −1, 0, −1, 0, +1, 0, +1, 0, −1, 0, +1, 0, −1, 0, +1, 0, +1, 0, +1, 0, +1, 0, +1, 0, +1, 0, −1, 0, −1, 0, −1, 0, −1, 0, +1, 0, −1, 0, +1, 0, −1, 0, −1, 0, −1, 0, −1, 0, −1, 0, −1, 0, −1, 0, +1, 0, +1, 0, −1, 0, −1, 0, +1, 0, −1, 0, +1, 0, −1, 0, +1, 0, +1, 0, +1, 0, +1, 0, +1, 0, −1, 0, −1, 0, −1, 0, −1, 0, +1, 0, −1, 0, +1, 0, −1, 0, 0, 0, 0, 0, 0, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, −1, 0, −1, 0, +1, 0, −1, 0, +1, 0, +1, 0, −1, 0, +1, 0, −1, 0, +1, 0, +1, 0, +1, 0, +1, 0, +1, 0, +1, 0, +1, 0, −1, 0, −1, 0, +1, 0, +1, 0, −1, 0, +1, 0, −1, 0, +1, 0, −1, 0, −1, 0, −1, 0, −1, 0, −1, 0, +1, 0, −1, 0, +1, 0, +1, 0, −1, 0, +1, 0, −1, 0, +1, 0, +1, 0, +1, 0, +1, 0, +1, 0, +1, 0, +1, 0, −1, 0, −1, 0, +1, 0, +1, 0, −1, 0, +1, 0, −1, 0, +1, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, −1, 0, −1, 0, +1, 0, −1, 0, +1, 0, +1, 0, −1, 0, +1, 0, −1, 0, +1, 0, +1, 0, −1, 0, −1, 0, −1, 0, −1, 0, −1, 0, +1, 0, +1, 0, −1, 0, −1, 0, +1, 0, −1, 0, +1, 0, −1, 0, +1, 0, +1, 0, +1, 0, +1, 0, +1, 0, −1, 0, +1, 0, −1, 0, −1, 0, +1, 0, −1, 0, +1, 0, −1, 0, +1};

HE-LTF80 MHz_2x={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0, +1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, +1, 0, +1, 0, −1, 0, +1, 0, +1, 0, +1, 0, +1, 0, +1, 0, −1, 0, −1, 0, −1, 0, +1, 0, −1, 0, −1, 0, −1, 0, −1, 0, +1, 0, −1, 0, +1, 0, +1, 0, −1, 0, −1, 0, −1, 0, −1, 0, +1, 0, +1, 0, +1, 0, −1, 0, +1, 0, +1, 0, −1, 0, +1, 0, +1, 0, −1, 0, −1, 0, +1, 0, −1, 0, −1, 0, −1, 0, −1, 0, +1, 0, −1, 0, +1, 0, −1, 0, +1, 0, +1, 0, −1, 0, +1, 0, +1, 0, −1, 0, +1, 0, −1, 0, −1, 0, −1, 0, −1, 0, +1, 0, −1, 0, +1, 0, +1, 0, −1, 0, −1, 0, +1, 0, −1, 0, −1, 0, −1, 0, +1, 0, −1, 0, −1, 0, −1, 0, +1, 0, +1, 0, −1, 0, +1, 0, −1, 0, +1, 0, +1, 0, +1, 0, −1, 0, −1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, +1};

HE-LTF160 MHz_2x={HE-LTF80 MHz_lower_2x, 0, 0, 0, 0, 0, 0, 0, 0, 0, 0, 0, 0, 0, 0, 0, 0, 0, 0, 0, 0, 0, 0, 0, HE-LTF80 MHz_upper_2x};

HE-LTF80 MHz_lower_2x={HE-LTF$_{80\ MHz_part1_2x}$, HE-LTF$_{80\ MHz_part2_2x}$, HE-LTF$_{80\ MHz_part3_2x}$, LTF$_{80\ MHz_part4_2x}$, LTF$_{80\ MHz_part5_2x}$};

HE-LTF80 MHz_upper_2x={HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$};

HE-LTF$_{80\ MHz_part1_2x}$={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0};

HE-LTF$_{80\ MHz_part2_2x}$={±1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0};

HE-LTF$_{80\ MHz_part3_2x}$={+1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1};

HE-LTF$_{80\ MHz_part4_2x}$={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}; and $\text{HE-LTF}_{80\ MHz\_part5\_2x}$={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}.

(3) 4x Mode

In this application, an HE-LTF sequence in the 20 MHz channel bandwidth and the 4x mode is denoted as HE-LTF20 MHz_4x; an HE-LTF sequence in the 40 MHz channel bandwidth and the 4x mode is denoted as HE-LTF40 MHz_4x; an HE-LTF sequence in the 80 MHz channel bandwidth and the 4x mode is denoted as HE-LTF80 MHz_4x; and an HE-LTF sequence in the 160 MHz channel bandwidth and the 4x mode is denoted as HE-LTF160 MHz_4x.

HE-LTF20 MHz_4x={−1, −1, +1, −1, +1, −1, +1, +1, +1, −1, +1, +1, +1, −1, −1, +1, −1, −1, −1, −1, −1, +1, +1, −1, −1, −1, −1, +1, +1, −1, +1, −1, +1, +1, +1, +1, −1, +1, −1, −1, +1, +1, −1, +1, +1, +1, +1, −1, −1, +1, −1, −1, −1, +1, +1, +1, +1, −1, +1, +1, −1, −1, −1, −1, +1, −1, −1, +1, +1, −1, +1, −1, −1, −1, −1, +1, −1, +1, −1, −1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, +1, −1, +1, +1, +1, 0, 0, 0, −1, +1, −1, +1, −1, +1, +1, −1, +1, +1, +1, −1, −1, +1, −1, −1, +1, −1, +1, −1, +1, +1, +1, −1, +1, +1, +1, −1, −1, +1, −1, −1, −1, −1, −1, +1, +1, −1, −1, −1, −1, −1, −1, +1, −1, +1, −1, −1, −1, −1, +1, −1, +1, +1, −1, −1, +1, −1, −1, −1, −1, +1, +1, −1, +1, +1, +1, +1, +1, +1, +1, −1, +1, +1, −1, −1, −1, −1, +1, −1, −1, +1, +1, −1, +1, −1, −1, −1, −1, +1, −1, +1, −1, −1, +1, +1, +1, +1, −1, −1, +1, +1, +1, +1, +1, −1, +1, +1, −1, −1, −1, +1, −1, −1, −1, +1, −1, +1, −1, +1, +1};

HE-LTF40 MHz_4x={+1, −1, −1, −1, −1, +1, −1, −1, +1, +1, −1, +1, −1, +1, −1, +1, +1, −1, +1, −1, −1, −1, +1, +1, −1, −1, −1, −1, −1, −1, −1, +1, −1, −1, +1, +1, −1, +1, −1, −1, −1, −1, −1, +1, −1, +1, +1, +1, −1, −1, +1, +1, +1, −1, −1, +1, +1, +1, +1, −1, +1, +1, −1, −1, +1, −1, +1, −1, +1, −1, −1, +1, −1, +1, +1, +1, −1, −1, +1, +1, +1, −1, −1, −1, −1, +1, −1, −1, +1, +1, −1, +1, −1, −1, −1, −1, −1, +1, −1, +1, +1, +1, −1, −1, +1, +1, +1, +1, +1, +1, +1, +1, −1, +1, +1, −1, −1, +1, −1, +1, +1, +1, +1, +1, −1, +1, −1, −1, −1, +1, +1, −1, −1, −1, −1, −1, −1, −1, −1, −1, +1, −1, −1, +1, +1, −1, +1, −1, +1, −1, +1, +1, −1, +1, −1, −1, −1, +1, +1, −1, −1, −1, −1, −1, −1, −1, +1, −1, −1, −1, −1, +1, −1, +1, +1, −1, −1, +1, −1, −1, +1, −1, −1, −1, −1, −1, +1, −1, +1, −1, −1, −1, −1, −1, +1, −1, +1, −1, +1, +1, −1, +1, +1, −1, −1, +1, −1, +1, −1, −1, +1, −1, +1, +1, +1, +1, −1, +1, +1, −1, −1, −1, −1, −1, −1, +1, +1, −1, +1, +1, +1, +1, +1, −1, −1, +1, −1, −1, −1, −1, −1, −1, +1, +1, −1, +1, +1, −1, −1, −1, −1, −1, −1, +1, −1, −1, −1, −1, −1, +1, +1, +1, −1, −1, −1, +1, −1, −1, −1, −1, +1, −1, −1, −1, +1, +1, −1, −1, −1, −1, +1, +1, −1, −1, −1, +1, +1, +1, −1, +1, +1, −1, +1, +1, −1, +1, −1, −1, −1, +1, +1, −1, +1, −1, +1, −1, −1, −1, −1, −1, +1, −1, +1, −1, +1, +1, −1, −1, +1, +1, −1, +1, −1, −1, −1, +1, −1, −1, +1, −1, +1, −1, +1, +1, +1, +1, +1, −1, −1, −1, −1, −1, −1, −1, +1, −1, −1, −1, −1, −1, −1, +1, −1, +1, +1, −1, −1, −1, −1, +1, −1, −1, −1, −1, −1, −1, +1, +1, +1, −1, +1, +1, −1, −1, −1, −1, −1, +1, −1, +1, +1, −1, −1, +1, +1, −1, −1, +1, +1, +1, −1, −1, −1, −1, −1, −1, −1, +1, −1, −1, +1, +1, −1, +1, +1, −1, +1, −1, +1, +1, −1, +1, −1, −1, −1, +1, +1, −1, +1, −1, +1, +1, +1, −1, −1, −1, −1, +1, +1, +1, +1, +1, −1, +1, +1, −1, −1, +1, −1, +1, −1, −1, +1, +1, +1, +1, −1, −1, −1, +1, +1, −1, −1, +1, +1, −1, +1, −1, −1, −1, −1, −1, −1, −1, +1, −1, −1, −1, −1, −1, +1, +1, +1, +1, +1, −1, +1, −1, −1, −1, +1, +1, −1, −1, −1};

HE-LTF80 MHz_4x={+1, +1, −1, +1, −1, +1, −1, −1, −1, +1, −1, −1, −1, +1, +1, −1, +1, +1, +1, +1, +1, −1, −1, +1, +1, +1, +1, −1, +1, −1, +1, −1, −1, +1, +1, −1, +1, +1, +1, −1, −1, +1, −1, −1, −1, −1, +1, +1, +1, −1, −1, −1, −1, −1, −1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, −1, +1, +1, +1, −1, +1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, +1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, −1, +1, −1, −1, −1, +1, +1, −1, +1, +1, +1, +1, −1, −1, −1, +1, +1, −1, −1, +1, +1, +1, +1, −1, +1, −1, −1, −1, −1, −1, −1, +1, −1, −1, −1, +1, −1, −1, +1, +1, +1, −1, +1, −1, +1, +1, −1, −1, +1, −1, +1, −1, −1, −1, −1, −1, +1, +1, −1, −1, −1, +1, −1, −1, +1, +1, +1, −1, +1, −1, −1, +1, −1, −1, +1, −1, +1, +1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, −1, +1, +1, +1, −1, +1, +1, +1, −1, −1, +1, −1, −1, −1, −1, −1, +1, +1, −1, −1, −1, +1, −1, +1, −1, +1, +1, −1, −1, +1, −1, −1, −1, +1, +1, −1, +1, +1, +1, +1, +1, +1, +1, −1, −1, +1, +1, +1, +1, +1, +1, +1, −1, +1, +1, +1, −1, +1, +1, +1, −1, −1, +1, −1, −1, −1, −1, −1, +1, +1, −1, −1, −1, +1, −1, +1, −1, +1, +1, −1, +1, −1, +1, −1, +1, −1, +1, +1, +1, +1, +1, −1, −1, +1, +1, +1, −1, +1, +1, −1, −1, −1, +1, −1, +1, +1, −1, +1, +1, −1, +1, +1, −1, +1, −1, −1, −1, +1, −1, +1, −1, −1, −1, −1, +1, +1, +1, −1, −1, +1, 0, 0, 0, 0, 0, +1, −1, −1, −1, −1, −1, −1, +1, −1, +1, +1, −1, −1, +1, +1, −1, +1, −1, +1, +1, −1, −1, +1, −1, +1, −1, −1, −1, +1, +1, −1, +1, +1, +1, −1, +1, +1, +1, +1, +1, +1, +1, −1, +1, −1, −1, +1, −1, −1, +1, −1, +1, +1, +1, −1, −1, +1, −1, −1, −1, +1, +1, −1, −1, −1, −1, −1, +1, −1, −1, −1, −1, −1, +1, +1, −1, −1, −1, −1, −1, +1, −1, −1, +1, +1, +1, −1, +1, +1, +1, −1, +1, −1, +1, −1, −1,

−1, −1, −1, +1, +1, +1, −1, −1, −1, −1, +1, −1, −1, +1, +1, +1, −1, +1, +1, −1, −1, +1, −1, +1, −1, −1, −1, −1, −1, −1, −1, +1, +1, −1, −1, −1, +1, −1, −1, +1, +1, +1, −1, +1, −1, −1, +1, −1, −1, +1, −1, +1, +1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, −1, +1, −1, +1, −1, +1, +1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, +1, −1, +1, +1, +1, +1, +1, −1, −1, +1, +1, +1, +1, +1, −1, +1, +1, −1, −1, −1, +1, −1, −1, −1, +1, −1, +1, −1, +1, +1, +1, +1, +1, −1, −1, −1, +1, +1, +1, +1, −1, +1, +1, −1, −1, −1, +1, −1, −1, +1, +1, −1, +1, −1, +1, −1, −1, −1, −1, −1, −1, +1, +1, −1, −1, −1, +1, −1, −1, +1, +1, +1, −1, +1, −1, −1, +1, −1, −1, +1, −1, +1, −1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, −1, +1, −1, +1, −1, +1};

HE-LTF160 MHz_4x={$LTF_{80\ MHz\_lower\_4x}$, 0, 0, 0, 0, 0, 0, 0, 0, 0, 0, 0, 0, 0, 0, 0, 0, 0, 0, 0, 0, 0, 0, 0, $LTF_{80\ MHz\_upper\_4x}$};

$\text{HE-LTF}_{80\ MHz\_lower\_4x}$={HE-LTF80_left_4x, 0, HE-LTF80 MHz_right_4x};

$\text{HE-LTF}_{80\ MHz\_upper\_4x}$={HE-LTF80 MHz_left_4x, 0, −HE-LTF80 MHz_right_4x};

HE-LTF80 MHz_left_4x={+1, +1, −1, +1, −1, +1, −1, −1, −1, +1, −1, −1, −1, +1, +1, −1, +1, +1, +1, +1, +1, −1, −1, +1, +1, +1, +1, −1, +1, −1, +1, −1, −1, +1, +1, −1, +1, +1, +1, −1, −1, +1, −1, −1, −1, −1, +1, +1, +1, −1, −1, −1, −1, −1, −1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, +1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, +1, −1, −1, −1, −1, −1, −1, +1, −1, −1, −1, +1, −1, −1, +1, +1, +1, −1, +1, −1, +1, +1, −1, −1, +1, −1, +1, −1, −1, −1, −1, −1, +1, +1, −1, −1, −1, +1, −1, −1, +1, +1, +1, −1, +1, −1, −1, +1, −1, −1, +1, −1, +1, +1, +1, +1, +1, +1, −1, −1, +1, +1, +1, +1, +1, −1, +1, +1, −1, −1, −1, +1, −1, −1, −1, +1, −1, +1, −1, +1, +1, −1, +1, −1, +1, −1, +1, +1, +1, −1, +1, +1, +1, −1, −1, +1, −1, −1, −1, −1, −1, +1, +1, −1, −1, −1, −1, +1, −1, +1, −1, +1, +1, −1, −1, +1, −1, −1, −1, +1, +1, −1, +1, +1, +1, +1, −1, −1, −1, +1, +1, +1, +1, −1, −1, +1, +1, +1, +1, +1, +1, −1, +1, +1, +1, −1, +1, +1, −1, −1, −1, +1, −1, +1, −1, −1, +1, +1, −1, +1, −1, +1, +1, +1, +1, +1, −1, −1, +1, +1, +1, −1, +1, +1, −1, −1, −1, +1, −1, +1, +1, −1, +1, +1, −1, +1, −1, −1, +1, −1, +1, −1, −1, +1, −1, +1, −1, −1, −1, −1, +1, +1, +1, −1, −1, +1, 0, 0}; and HE-LTF80 MHz_right_4x={0, 0, +1, −1, −1, −1, −1, −1, −1, +1, −1, +1, +1, −1, −1, +1, +1, −1, +1, −1, +1, +1, −1, −1, +1, −1, +1, −1, −1, −1, +1, +1, −1, +1, +1, +1, −1, +1, +1, +1, +1, +1, +1, +1, −1, +1, −1, −1, +1, −1, −1, +1, −1, +1, +1, +1, −1, −1, +1, −1, −1, −1, +1, +1, −1, −1, −1, −1, −1, +1, −1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, −1, +1, −1, +1, −1, −1, −1, −1, −1, −1, −1, +1, +1, −1, −1, −1, +1, −1, −1, +1, +1, +1, −1, +1, −1, −1, +1, −1, −1, +1, −1, +1, +1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, −1, +1, −1, +1, −1, +1, +1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, +1, +1, +1, +1, −1, −1, +1, +1, +1, +1, +1, −1, +1, +1, −1, −1, −1, +1, −1, −1, −1, +1, −1, +1, −1, −1, +1, +1, +1, +1, −1, −1, −1, +1, +1, +1, +1, −1, +1, +1, −1, −1, −1, +1, −1, −1, +1, +1, −1, +1, 1, +1, −1, −1, −1, −1, −1, −1, +1, +1, −1, −1, −1, +1, −1, −1, +1, +1, +1, −1, +1, −1, −1, +1, −1, −1, +1, −1, +1, −1, +1, −1, +1, −1, −1, +1, +1, −1, +1, −1, +1, +1, +1, −1, −1, +1, −1, −1, −1, +1, −1, −1, −1, −1, −1, −1, −1, +1, −1, +1, +1, −1, +1, +1, −1, +1, −1, −1, −1, +1, +1, −1, +1, +1, +1, −1, −1, +1, +1, +1, +1, +1, −1, +1, −1, −1, −1, −1, +1, +1, −1, −1, −1, −1, −1, +1, −1, −1, +1, +1, +1, −1, +1, +1, +1, −1, +1, −1, +1, −1, −1, −1, −1, −1, +1, +1, +1, −1, −1, −1, −1, +1, −1, −1, +1, +1, +1, −1, +1, +1, −1, −1, +1, −1, +1, −1, +1}.

4. Peak-to-Average Power Ratio

A peak-to-average power ratio (peak to average power ratio, PAPR) may be a ratio, in a symbol, of an instantaneous power peak of continuous signals to an average value of signal power. The ratio may be represented as follows:

$$PAPR = 10\log_{10}\left(\frac{\max\left(X_i^2\right)}{\operatorname{mean}\left(X_i^2\right)}\right)$$

$X_i$ denotes a time domain discrete value of a sequence; $\max(X_i^2)$ denotes a maximum value of a square of the time domain discrete value; mean $(X_i^2)$ denotes an average value of the square of the time domain discrete value.

An OFDM system is disadvantageous in a high PAPR. Especially in a large bandwidth, more subcarriers lead to a higher PAPR, and a high PAPR leads to nonlinear distortion of a signal and deteriorates system performance. Therefore, it is required that a PAPR of a sequence be as low as possible during sequence design.

5. Golay Complementary Pair a=(a(0), . . . , a(N−1)) and b=(b(0), . . . , b(N−1)) are made binary sequences with a length of N. A non-periodic cross-correlation function of the binary sequences is defined as follows:

$$C_{a,b}(\tau)=\sum_{i=0}^{N-1} a_i b_{i+\tau},$$

where 1≤τ<N. If $C_{a,b}(0)=0$, a and b are considered orthogonal. When a=b, it is considered that $C_{a,b}(\tau)$ is a non-periodic autocorrelation function of a, and is denoted as $C_a(\tau)$ for short.

If the two sequences a and b with the length of N meet the following relationship:

$C_a(\tau)+C_b(\tau)=0$, where it is considered that a and b are a Golay complementary pair.

For example, when N=2, a={1, 1}, and b={1, −1}.

For example, when N=10, a={1, 1, −1, 1, −1, 1, −1, −1, 1, 1}, and b={1, 1, −1, 1, 1, 1, 1, 1, −1, −1}.

For example, when N=26, a={+1, +1, +1, +1, −1, +1, +1, −1, −1, +1, −1, +1, −1, +1, −1, −1, +1, −1, +1, +1, +1, −1, −1, +1, +1, +1}, and b={+1, +1, +1, +1, −1, +1, +1, −1, −1, +1, −1, +1, +1, +1, +1, +1, −1, +1, −1, −1, −1, +1, +1, −1, −1, −1}.

It should be noted that in embodiments of this application, a "protocol" may be a standard protocol in the communications field, for example, may include an LTE protocol, an NR protocol, a WLAN protocol, and a related protocol applied to a subsequent communications system. This is not limited in this application.

It should be further noted that, in the embodiments of this application, "pre-obtaining" may include indication by network device signaling or predefinition, for example, definition in a protocol. "Predefined" may be implemented by prestoring corresponding code or a corresponding table in a device (for example, including a terminal device and an access network device), or another manner that may be used to indicate related information. A specific implementation is not limited in this application. For example, the predefinition may refer to defining in a protocol.

It should be further noted that "storing" in the embodiments of this application may refer to storing in one or more memories. The one or more memories may be separately disposed, or may be integrated into an encoder, a decoder, a processor, or a communications apparatus. Alternatively, some of the one or more memories may be separately disposed, and the others are integrated into a decoder, a processor, or a communications apparatus. The memory may be a storage medium in any form. This is not limited in this application.

It should be further noted that in the embodiments of this application, "of", "corresponding (relevant)", and "corresponding" are interchangeable sometimes. It should be noted that, when differences between the terms are not emphasized, meanings of the terms are the same.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. Similar to "A and/or B", "at least one of A and B" describes an association relationship for describing associated objects and represents that three relationships may exist. For example, at least one of A and B may represent the following three cases: Only A exists, both A and B exist, and only B exists.

The technical solutions provided in this application are described in detail below with reference to the accompanying drawings. The embodiments of this application may be applied to a plurality of different scenarios, including but not limited to the scenario shown in FIG. 1. For example, for uplink transmission, a STA may serve as a transmit end, and an AP may serve as a receive end. For downlink transmission, an AP may serve as a transmit end, and a STA may serve as a receive end. For another transmission scenario, for example, data transmission between APs, one AP may serve as a transmit end, and the other AP may serve as a receive end. For another example, for uplink transmission between STAs, one STA may serve as a transmit end, and the other STA may serve as a receive end. Therefore, the following describes the embodiments of this application based on a transmit end and a receive end.

Figure 5:
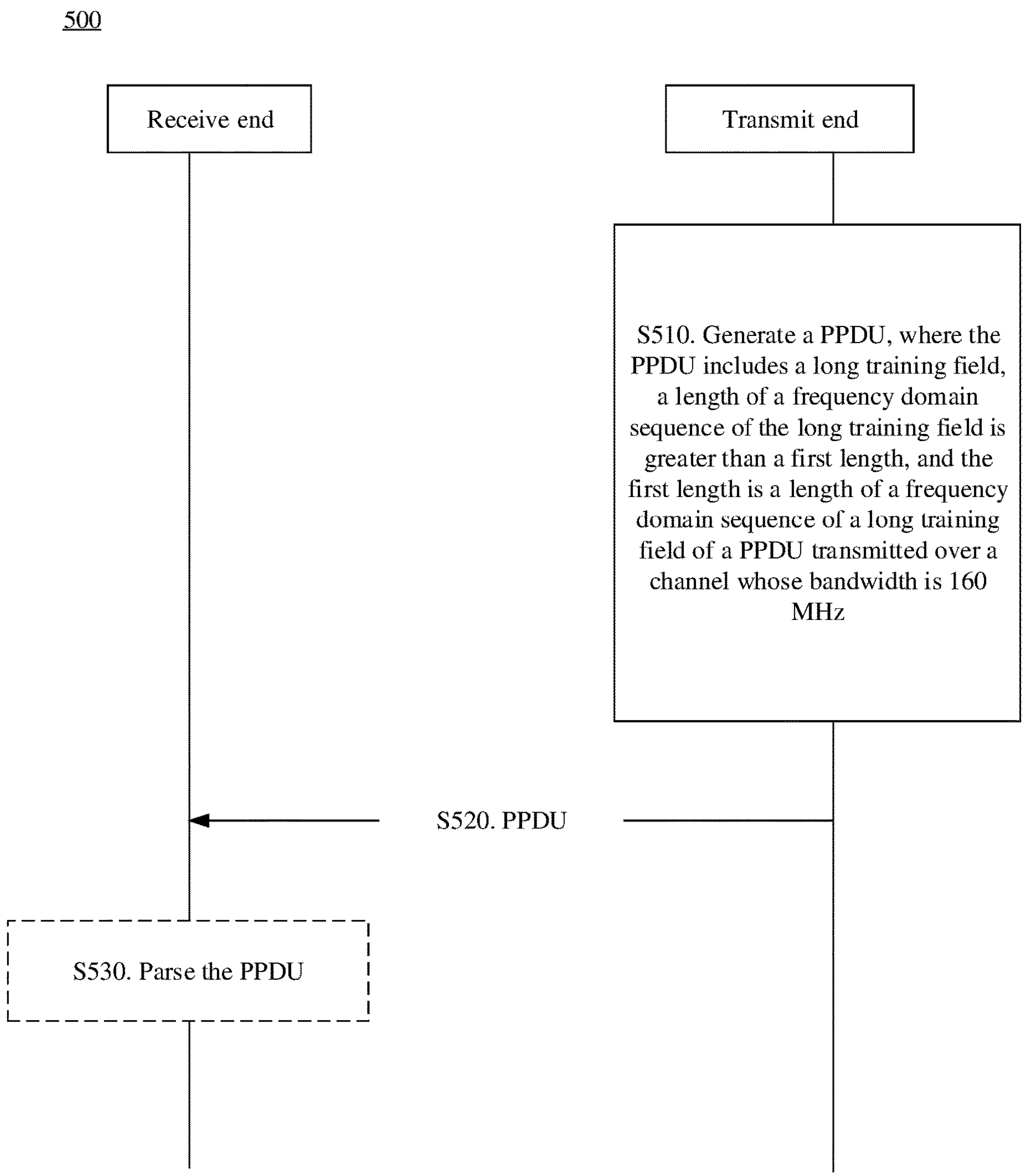
FIG. 5 is a schematic flowchart of a method for transmitting a physical layer protocol data unit according to an embodiment of this application.

FIG. 5 is a schematic flowchart of a method 500 for transmitting a physical layer protocol data unit according to an embodiment of this application. The method 500 shown in FIG. 5 may include the following steps.

S510. A transmit end generates a physical layer protocol data unit PPDU, where the PPDU includes a long training field, a length of a frequency domain sequence of the long training field is greater than a first length, and the first length is a length of a frequency domain sequence of a long training field of a PPDU transmitted over a channel whose bandwidth is 160 MHz.

S520. The transmit end sends the PPDU over a target channel, where a bandwidth of the target channel is greater than 160 MHz.

Correspondingly, a receive end receives the PPDU over the target channel.

Optionally, the method 500 may further include step 530. In S530, the receive end parses the PPDU. For a specific parsing manner, refer to an existing description. This is not limited.

The foregoing long training field may also be referred to as a long training field, and expressed as a long training field below.

In this embodiment of this application, to differentiate between a conventional long training field and an HE-LTF in IEEE 802.11ax, a long training field corresponding to the bandwidth of the target channel is represented by using an EHT-LTF. It should be understood that, the EHT-LTF is used to indicate a long training field corresponding to a bandwidth greater than 160 MHz that is supportable in a next-generation WLAN technology. A specific name of the EHT-LTF sets no limitation on the protection scope of the embodiments of this application.

In this embodiment of this application, the first length is used to represent a length of a frequency domain sequence corresponding to a bandwidth of 160 MHz. The length of the frequency domain sequence of the long training field is greater than the first length. In other words, in the foregoing method 500, a length of a frequency domain sequence of the EHT-LTF is greater than a length of a frequency domain sequence of an HE-LTF whose channel bandwidth is 160 MHz. For example, the 160 MHz HE-LTF may be obtained by splicing two 80 MHz HE-STFs by multiplying a rotation factor, a 240 MHz EHT-LTF may be obtained by splicing three 80 MHz HE-STFs by multiplying the rotation factor, or a 320 MHz EHT-LTF may be obtained by splicing four 80 MHz HE-STFs by multiplying the rotation factor. Therefore, the length of the frequency domain sequence of the EHT-LTF is greater than the length of the frequency domain sequence of the HE-LTF whose channel bandwidth is 160 MHz.

The length of the frequency domain sequence of the long training field is greater than the first length. Alternatively, it may be understood that, a quantity of frequency domain values of the EHT-LTF is greater than a quantity of frequency domain values of the 160 MHz HE-LTF in. The length of the frequency domain sequence of the long training field is greater than the first length. Alternatively, it may be understood that, a quantity of subcarrier numbers corresponding to the EHT-LTF is greater than a quantity of subcarrier numbers corresponding to the 160 MHz HE-LTF. For example, a 240 MHz bandwidth has a total of 3072 subcarriers, and the 3072 subcarriers correspond to 3072 frequency domain values; and a 160 MHz bandwidth has a total of 1024 subcarriers, and the 1024 subcarriers correspond to 1024 frequency domain values. Therefore, a quantity of frequency domain values of the 240 MHz EHT-LTF is greater than a quantity of frequency domain values of the 160 MHz HE-LTF, and a quantity of subcarrier numbers of the 240 MHz EHT-LTF is greater than a quantity of subcarrier numbers of the 160 MHz HE-LTF.

In this embodiment of this application, the bandwidth of the target channel is greater than 160 MHz. Alternatively, the bandwidth of the target channel may be any bandwidth greater than 160 MHz. For example, the bandwidth of the target channel is 200 MHz, 240 MHz, 280 MHz, or 320 MHz.

An EHT-STF in the bandwidth of the target channel in this embodiment of this application may be obtained through simulation calculation. For example, the transmit end may obtain the EHT-STF by calculation by using a corresponding formula based on a sequence specified in a protocol (for example, an HE-LTF sequence in IEEE 802.11ax). For another example, the transmit end may obtain the EHT-STF by calculation by using a corresponding formula based on a stored or newly generated sequence. This is not limited in this embodiment of this application.

Based on the foregoing technical solution, a long training sequence (also referred to as a frequency domain sequence) that corresponds to a larger channel bandwidth can be designed, to enable a receive end to transmit data on a larger channel bandwidth. The long training sequence may be obtained based on the long training sequence of the existing channel bandwidth, and a long training sequence with good performance may be obtained through simulation calculation, for example, parameter adjustment. Along training field may be obtained based on the long training sequence. According to this embodiment of this application, a larger channel bandwidth can be met in practice. Further, the long training sequence provided in this embodiment of this application is verified by performing enumerated simulation on parameters. A peak-to-average power ratio PAPR is relatively low and performance is relatively good, thereby improving spectrum utilization of a system.

Corresponding EHT-LTFs may be separately designed considering that there are three different modes (the 1x mode, the 2x mode, and the 4x mode). Therefore, the following describes in detail the method in this embodiment of this application based on different cases. In this embodiment of this application, for a specific form of a sequence in IEEE 802.11ax, refer to the foregoing description. Details are not described herein again.

Case 1: A transmission mode is 4x.

In Embodiment 1, a sequence in IEEE 802.11ax may be used to construct a sequence in IEEE 802.11be, so that compatibility is higher and implementation is easy.

1. An 80 MHz sequence in IEEE 802.11ax is used for construction.

In this embodiment of this application, an LTF sequence in the 80 MHz bandwidth in the 4x mode in IEEE 802.11ax is denoted as HE-LTF80 MHz_4x, and HE-LTF80 MHz_4x={HE-LTF80 MHz_left_4x, 0, HE-LTF80 MHz_right_4x}. HE-LTF80 MHz_4x' is constructed first to construct another sequence. Specifically, HE-LTF80 MHz_4x' is constructed based on HE-LTF80 MHz_4x. HE-LTF80 MHz_4x'={HE-LTF80 MHz_left_4x, 0, −HE-LTF80 MHz_right_4x}. For the sequence in IEEE 802.11ax, refer specifically to the foregoing description. Details are not described herein again.

(1) An LTF sequence in the 160 MHz bandwidth in the 4x mode is constructed, and denoted as EHT-LTF160 MHz_4x.

In a possible implementation, EHT-LTF160 MHz_4x is made to meet: EHT-LTF160 MHz_4x={+HE-LTF80 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF160 MHz_4x={+HE-LTF80 MHz_4x, $0_{23}$, +HE-LTF80 MHz_4x'}; or

EHT-LTF160 MHz_4x={−HE-LTF80 MHz_4x, $0_{23}$, −HE-LTF80 MHz_4x'}.

A PAPR of the EHT-LTF sequence in the 160 MHz bandwidth in the 4x mode is 6.9295 dB.

(2) An LTF sequence in the 240 MHz bandwidth in the 4x mode is constructed, and denoted as EHT-LTF240 MHz_4x.

In a possible implementation, EHT-LTF240 MHz_4x is made to meet: EHT-LTF240 MHz_4x={±HE-LTF80 MHz_4x, $0_{23}$, ±HE-LTF80 MHz_4x', $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x, $0_{23}$, HE-LTF80 MHz_4x', $0_{23}$, −HE-LTF80 MHz_4x}; or

EHT-LTF240 MHz_4x={−HE-LTF80 MHz_4x, $0_{23}$, −HE-LTF80 MHz_4x', $0_{23}$, HE-LTF80 MHz_4x}.

A PAPR of the EHT-LTF sequence in the 240 MHz bandwidth in the 4x mode is 7.8474 dB.

In a possible implementation, EHT-LTF240 MHz_4x is made to meet: EHT-LTF240 MHz_4x={±HE-LTF80 MHz_4x, $0_{23}$, ±HE-LTF80 MHz_4x, $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF240 MHz_4x={−HE-LTF80 MHz_4x, $0_{23}$, HE-LTF80 MHz_4x, $0_{23}$, −HE-LTF80 MHz_4x}; or

EHT-LTF240 MHz_4x={HE-LTF80 MHz_4x, $0_{23}$, −HE-LTF80 MHz_4x, $0_{23}$, HE-LTF80 MHz_4x}.

A PAPR of the EHT-LTF sequence in the 240 MHz bandwidth in the 4x mode is 7.9354 dB.

In a possible implementation, EHT-LTF240 MHz_4x is made to meet: EHT-LTF240 MHz_4x={±HE-LTF80 MHz_4x', $0_{23}$, ±HE-LTF80 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x', $0_{23}$, HE-LTF80 MHz_4x, $0_{23}$, −HE-LTF80 MHz_4x'}; or

EHT-LTF240 MHz_4x={−HE-LTF80 MHz_4x', $0_{23}$, −HE-LTF80 MHz_4x, $0_{23}$, HE-LTF80 MHz_4x'}.

A PAPR of the EHT-LTF sequence in the 240 MHz bandwidth in the 4x mode is 8.0238 dB.

In a possible implementation, EHT-LTF240 MHz_4x is made to meet: EHT-LTF240 MHz_4x={±HE-LTF80 MHz_4x', $0_{23}$, ±HE-LTF80 MHz_4x', $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x', $0_{23}$, −HE-LTF80 MHz_4x', $0_{23}$, −HE-LTF80 MHz_4x'}; or

EHT-LTF240 MHz_4x={−HE-LTF80 MHz_4x', $0_{23}$, −HE-LTF80 MHz_4x', $0_{23}$, HE-LTF80 MHz_4x'}.

A PAPR of the EHT-LTF sequence in the 240 MHz bandwidth in the 4x mode is 8.9900 dB.

In a possible implementation, EHT-LTF240 MHz_4x is made to meet: EHT-LTF240 MHz_4x={±HE-LTF80 MHz_4x, $0_{23}$, ±HE-LTF80 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x, $0_{23}$, −HE-LTF80 MHz_4x, $0_{23}$, −HE-LTF80 MHz_4x'}; or

EHT-LTF240 MHz_4x={−HE-LTF80 MHz_4x, $0_{23}$, HE-LTF80 MHz_4x, $0_{23}$, HE-LTF80 MHz_4x'}.

A PAPR of the EHT-LTF sequence in the 240 MHz bandwidth in the 4x mode is 7.9354 dB.

(3) An LTF sequence in the 320 MHz bandwidth in the 4x mode is constructed, and denoted as EHT-LTF320 MHz_4x.

In a possible implementation, EHT-LTF320 MHz_4x is made to meet: EHT-LTF320 MHz_4x={+HE-LTF80 MHz_4x, $0_{23}$, ±HE-LTF80 MHz_4x, $0_{23}$, ±HE-LTF80 MHz_4x, $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF320 MHz_4x={HE-LTF80 MHz_4x, $0_{23}$, HE-LTF80 MHz_4x, $0_{23}$, −HE-LTF80 MHz_4x, $0_{23}$, −HE-LTF80 MHz_4x}; or

EHT-LTF320 MHz_4x={HE-LTF80 MHz_4x, $0_{23}$, −HE-LTF80 MHz_4x, $0_{23}$, HE-LTF80 MHz_4x, $0_{23}$, HE-LTF80 MHz_4x}; or

EHT-LTF320 MHz_4x={−HE-LTF80 MHz_4x, $0_{23}$, HE-LTF80 MHz_4x, $0_{23}$, HE-LTF80 MHz_4x, $0_{23}$, −HE-LTF80 MHz_4x}; or

EHT-LTF320 MHz_4x={−HE-LTF80 MHz_4x, $0_{23}$, −HE-LTF80 MHz_4x, $0_{23}$, HE-LTF80 MHz_4x, $0_{23}$, HE-LTF80 MHz_4x}.

A PAPR of the EHT-LTF sequence in the 320 MHz bandwidth in the 4x mode is 9.2954 dB.

In a possible implementation, EHT-LTF320 MHz_4x is made to meet: EHT-LTF320 MHz_4x={±HE-LTF80 MHz_4x, $0_{23}$, ±HE-LTF80 MHz_4x', $0_{23}$, ±HE-LTF80 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF320 MHz_4x={HE-LTF80 MHz_4x, $0_{23}$, −HE-LTF80 MHz_4x', $0_{23}$, HE-LTF80 MHz_4x, $0_{23}$, HE-LTF80 MHz_4x'}; or

EHT-LTF320 MHz_4x={−HE-LTF80 MHz_4x, $0_{23}$, HE-LTF80 MHz_4x', $0_{23}$, −HE-LTF80 MHz_4x, $0_{23}$, −HE-LTF80 MHz_4x'}.

A PAPR of the EHT-LTF sequence in the 320 MHz bandwidth in the 4x mode is 8.9288 dB.

In a possible implementation, EHT-LTF320 MHz_4x is made to meet: EHT-LTF320 MHz_4x={±HE-LTF80 MHz_4x, $0_{23}$, ±HE-LTF80 MHz_4x', $0_{23}$, ±HE-LTF80 MHz_4x, $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF320 MHz_4x={HE-LTF80 MHz_4x, $0_{23}$, HE-LTF80 MHz_4x', $0_{23}$, −HE-LTF80 MHz_4x, $0_{23}$, HE-LTF80 MHz_4x}; or

EHT-LTF320 MHz_4x={HE-LTF80 MHz_4x, $0_{23}$, −HE-LTF80 MHz_4x', $0_{23}$, −HE-LTF80 MHz_4x, $0_{23}$, HE-LTF80 MHz_4x}; or

EHT-LTF320 MHz_4x={−HE-LTF80 MHz_4x, $0_{23}$, −HE-LTF80 MHz_4x', $0_{23}$, HE-LTF80 MHz_4x, $0_{23}$, −HE-LTF80 MHz_4x}; or

EHT-LTF320 MHz_4x={−HE-LTF80 MHz_4x, $0_{23}$, HE-LTF80 MHz_4x', $0_{23}$, HE-LTF80 MHz_4x, $0_{23}$, −HE-LTF80 MHz_4x}.

A PAPR of the EHT-LTF sequence in the 320 MHz bandwidth in the 4x mode is 9.2472 dB.

In a possible implementation, EHT-LTF320 MHz_4x is made to meet: EHT-LTF320 MHz_4x={+HE-LTF80 MHz_4x, $0_{23}$, ±HE-LTF80 MHz_4x, $0_{23}$, ±HE-LTF80 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF320 MHz_4x={HE-LTF80 MHz_4x, $0_{23}$, HE-LTF80 MHz_4x, $0_{23}$, −HE-LTF80 MHz_4x, $0_{23}$, HE-LTF80 MHz_4x'}; or

EHT-LTF320 MHz_4x={HE-LTF80 MHz_4x, $0_{23}$, HE-LTF80 MHz_4x, $0_{23}$, −HE-LTF80 MHz_4x, $0_{23}$, −HE-LTF80 MHz_4x'}; or

EHT-LTF320 MHz_4x={HE-LTF80 MHz_4x, $0_{23}$, −HE-LTF80 MHz_4x, $0_{23}$, −HE-LTF80 MHz_4x, $0_{23}$, HE-LTF80 MHz_4x'}; or

EHT-LTF320 MHz_4x={HE-LTF80 MHz_4x, $0_{23}$, −HE-LTF80 MHz_4x, $0_{23}$, −HE-LTF80 MHz_4x, $0_{23}$, −HE-LTF80 MHz_4x'}; or

EHT-LTF320 MHz_4x={−HE-LTF80 MHz_4x, $0_{23}$, HE-LTF80 MHz_4x, $0_{23}$, HE-LTF80 MHz_4x, $0_{23}$, HE-LTF80 MHz_4x'}; or

EHT-LTF320 MHz_4x={−HE-LTF80 MHz_4x, $0_{23}$, HE-LTF80 MHz_4x, $0_{23}$, HE-LTF80 MHz_4x, $0_{23}$, −HE-LTF80 MHz_4x'}; or

EHT-LTF320 MHz_4x={−HE-LTF80 MHz_4x, $0_{23}$, −HE-LTF80 MHz_4x, $0_{23}$, HE-LTF80 MHz_4x, $0_{23}$, HE-LTF80 MHz_4x'}; or

EHT-LTF320 MHz_4x={−HE-LTF80 MHz_4x, $0_{23}$, −HE-LTF80 MHz_4x, $0_{23}$, HE-LTF80 MHz_4x, $0_{23}$, −HE-LTF80 MHz_4x'}.

A PAPR of the EHT-LTF sequence in the 320 MHz bandwidth in the 4x mode is 9.2954 dB.

2. A 160 MHz sequence and an 80 MHz sequence in IEEE 802.11ax are used for construction.

In this embodiment of this application, an LTF sequence in the 160 MHz bandwidth in the 4x mode in IEEE 802.11ax is denoted as HE-LTF160 MHz_4x, and HE-LTF160 MHz_4x={HE-LTF160 MHz_left_4x, 0, HE-LTF160

MHz_right_4x}. HE-LTF160 MHz_4x' is constructed first to construct another sequence. Specifically, HE-LTF160 MHz_4x' is constructed based on HE-LTF160 MHz_4x. HE-LTF160 MHz_4x'={HE-LTF160 MHz_left_4x, 0, −HE-LTF160 MHz_right_4x}. For the sequence in IEEE 802.11ax, refer specifically to the foregoing description. Details are not described herein again.

(1) An LTF sequence in the 240 MHz bandwidth in the 4x mode is constructed, and denoted as EHT-LTF240 MHz_4x.

In a possible implementation, EHT-LTF240 MHz_4x is made to meet: EHT-LTF240 MHz_4x={+HE-LTF160 MHz_4x, $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF240 MHz_4x={HE-LTF160 MHz_4x, $0_{23}$, −HE-LTF80 MHz_4x}; or

EHT-LTF240 MHz_4x={−HE-LTF160 MHz_4x, $0_{23}$, HE-LTF80 MHz_4x}.

A PAPR of the EHT-LTF sequence in the 240 MHz bandwidth in the 4x mode is 7.8474 dB.

In a possible implementation, EHT-LTF240 MHz_4x is made to meet: EHT-LTF240 MHz_4x={±HE-LTF80 MHz_4x, $0_{23}$, ±HE-LTF160 MHz_4x}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x, $0_{23}$, −HE-LTF160 MHz_4x}; or

EHT-LTF240 MHz_4x={−HE-LTF80 MHz_4x, $0_{23}$, HE-LTF160 MHz_4x}.

A PAPR of the EHT-LTF sequence in the 240 MHz bandwidth in the 4x mode is 7.9354 dB.

In a possible implementation, EHT-LTF240 MHz_4x is made to meet: EHT-LTF240 MHz_4x={+HE-LTF160 MHz_4x', $0_{23}$, ±HE-LTF80 MHz_4x}. PAPRs of all possible sequences are traversed through computer-based searching, and a sequence with a relatively low PAPR is selected from all the possible sequences, so that the following can be determined:

EHT-LTF240 MHz_4x={HE-LTF160 MHz_4x', $0_{23}$, −HE-LTF80 MHz_4x}; or

EHT-LTF240 MHz_4x={−HE-LTF160 MHz_4x', $0_{23}$, HE-LTF80 MHz_4x}.

A PAPR of the EHT-LTF sequence in the 240 MHz bandwidth in the 4x mode is 8.2241 dB.

In a possible implementation, EHT-LTF240 MHz_4x is made to meet: EHT-LTF240 MHz_4x={±HE-LTF80 MHz_4x, $0_{23}$, ±HE-LTF160 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x, $0_{23}$, −HE-LTF160 MHz_4x'}; or

EHT-LTF240 MHz_4x={−HE-LTF80 MHz_4x, $0_{23}$, HE-LTF160 MHz_4x'}.

A PAPR of the EHT-LTF sequence in the 240 MHz bandwidth in the 4x mode is 8.2241 dB.

In a possible implementation, EHT-LTF240 MHz_4x is made to meet: EHT-LTF240 MHz_4x={±HE-LTF160 MHz_4x', $0_{23}$, ±HE-LTF160 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF160 MHz_4x', $0_{23}$, HE-LTF160 MHz_4x'}; or

EHT-LTF240 MHz_4x={−HE-LTF160 MHz_4x', $0_{23}$, −HE-LTF160 MHz_4x'}.

A PAPR of the EHT-LTF sequence in the 240 MHz bandwidth in the 4x mode is 8.0238 dB.

In a possible implementation, EHT-LTF240 MHz_4x is made to meet: EHT-LTF240 MHz_4x={±HE-LTF80 MHz_4x', $0_{23}$, ±HE-LTF160 MHz_4x}. PAPRs of all possible sequences are traversed through computer-based searching, and a sequence with a relatively low PAPR is selected from all the possible sequences, so that the following can be determined:

EHT-LTF240 MHz_4x={HE-LTF80 MHz_4x', $0_{23}$, −HE-LTF160 MHz_4x}; or

EHT-LTF240 MHz_4x={−HE-LTF80 MHz_4x', $0_{23}$, HE-LTF160 MHz_4x}.

A PAPR of the EHT-LTF sequence in the 240 MHz bandwidth in the 4x mode is 8.0401 dB.

In a possible implementation, EHT-LTF240 MHz_4x is made to meet: EHT-LTF240 MHz_4x={±HE-LTF160 MHz_4x, $0_{23}$, ±HE-LTF80 MHz_4x'}. PAPRs of all possible sequences are traversed through computer-based searching, and a sequence with a relatively low PAPR is selected from all the possible sequences, so that the following can be determined:

EHT-LTF240 MHz_4x={HE-LTF160 MHz_4x, $0_{23}$, −HE-LTF80 MHz_4x'}; or

EHT-LTF240 MHz_4x={−HE-LTF160 MHz_4x, $0_{23}$, HE-LTF80 MHz_4x'}.

A PAPR of the EHT-LTF sequence in the 240 MHz bandwidth in the 4x mode is 8.9900 dB.

(2) An LTF sequence in the 320 MHz bandwidth in the 4x mode is constructed, and denoted as EHT-LTF320 MHz_4x.

In a possible implementation, EHT-LTF320 MHz_4x is made to meet: EHT-LTF320 MHz_4x={±HE-LTF160 MHz_4x, $0_{23}$, ±HE-LTF160 MHz_4x}. PAPRs of all possible sequences are traversed through computer-based searching, and a sequence with a relatively low PAPR is selected from all the possible sequences, so that the following can be determined:

EHT-LTF320 MHz_4x={HE-LTF160 MHz_4x, $0_{23}$, HE-LTF160 MHz_4x}; or

EHT-LTF320 MHz_4x={−HE-LTF160 MHz_4x, $0_{23}$, −HE-LTF160 MHz_4x}.

A PAPR of the EHT-LTF sequence in the 320 MHz bandwidth in the 4x mode is 9.5100 dB.

In a possible implementation, EHT-LTF320 MHz_4x is made to meet: EHT-LTF240 MHz_4x={+HE-LTF160 MHz_4x, $0_{23}$, ±HE-LTF160 MHz_4x'}. PAPRs of all possible sequences are traversed through computer-based searching, and a sequence with a relatively low PAPR is selected from all the possible sequences, so that the following can be determined:

EHT-LTF320 MHz_4x={HE-LTF160 MHz_4x, $0_{23}$, HE-LTF160 MHz_4x'}; or

EHT-LTF320 MHz_4x={−HE-LTF160 MHz_4x, $0_{23}$, −HE-LTF160 MHz_4x'}.

A PAPR of the EHT-LTF sequence in the 320 MHz bandwidth in the 4x mode is 9.2499 dB.

In a possible implementation, EHT-LTF320 MHz_4x is made to meet: EHT-LTF240 MHz_4x={±HE-LTF160 MHz_4x', $0_{23}$, ±HE-LTF160 MHz_4x}. PAPRs of all possible sequences are traversed through computer-based searching, and a sequence with a relatively low PAPR is selected from all the possible sequences, so that the following can be determined:

EHT-LTF320 MHz_4x={HE-LTF160 MHz_4x', $0_{23}$, HE-LTF160 MHz_4x}; or

EHT-LTF320 MHz_4x={−HE-LTF160 MHz_4x', $0_{23}$, −HE-LTF160 MHz_4x}.

A PAPR of the EHT-LTF sequence in the 320 MHz bandwidth in the 4x mode is 8.9288 dB.

In a possible implementation, EHT-LTF320 MHz_4x is made to meet: EHT-LTF240 MHz_4x={±HE-LTF160 MHz_4x', $0_{23}$, ±HE-LTF160 MHz_4x'}. PAPRs of all possible sequences are traversed through computer-based searching, and a sequence with a relatively low PAPR is selected from all the possible sequences, so that the following can be determined:

EHT-LTF320 MHz_4x={HE-LTF160 MHz_4x', $0_{23}$, HE-LTF160 MHz_4x'}; or

EHT-LTF320 MHz_4x={−HE-LTF160 MHz_4x', $0_{23}$, −HE-LTF160 MHz_4x'}.

A PAPR of the EHT-LTF sequence in the 320 MHz bandwidth in the 4x mode is 9.7162 dB.

In Embodiment 2, a new sequence may be used to construct a sequence in IEEE 802.11be to obtain a more optimal LTF sequence.

In this embodiment of this application, a Golay complementary pair is used to construct an 80 MHz sequence. In this embodiment of this application, a newly constructed LTF sequence in the 80 MHz bandwidth in the 4x mode is denoted as EHT-LTF80 MHz_4x.

EHT-LTF80 MHz_4x is made to meet: EHT-LTF80 MHz_4x={$k_1$, $x_{106}$, $k_2$, $G_1$, $k_3$, $y_{106}$, $k_4$, $k_5$, $x_{106}$, $k_6$, $G_2$, $k_7$, $-y_{106}$, $k_8$, a(1:13), −1, $0_5$, 1, a(14:26), $k_9$, $x_{106}$, $k_{10}$, $G_3$, $k_{11}$, $y_{106}$, $k_{12}$, $k_{13}$, $-x_{106}$, $k_{14}$, $G_4$, $k_{15}$, $y_{106}$, $k_{16}$}, where $x_{106}$={a, b, 1, 1, a, −b}, $y_{106}$={a, b, −1, −1, −a, b} $k_i \in \{1, -1\}$, $i \in \{1, 2, \ldots, 16\}$, $G_j \in \{\pm a, \pm b\}$, $j \in \{1, 2, 3, 4\}$, a and b are a Golay complementary pair with a length of 26, a(1:13) indicates that the $1^{st}$ to the $13^{th}$ bits of sequence a are taken, and a(14:26) indicates that the $14^{th}$ to $26^{th}$ bits of sequence a are taken. Specifically, a={+1, +1, +1, +1, −1, +1, +1, −1, −1, +1, −1, +1, −1, +1, −1, −1, +1, −1, +1, +1, +1, −1, −1, +1, +1, +1}, and b={+1, +1, +1, +1, −1, +1, +1, −1, −1, +1, −1, +1, +1, +1, +1, +1, −1, +1, −1, −1, −1, +1, +1, −1, −1, −1}.

PAPRs of all possible sequences are traversed through computer-based searching, and a sequence with a relatively low PAPR is selected from all the possible sequences, so that the following can be determined:

EHT-LTF80 MHz_4x={+1, a, b, +1, +1, a, −b, +1, b, +1, a, b, −1, −1, −a, b, +1, +1, a, b, +1, +1, a, −b, +1, b, +1, −a, −b, +1, +1, a, −b, +1, +1, +1, +1, +1, −1, +1, +1, −1, −1, +1, −1, +1, −1, −1, 0, 0, 0, 0, 0, +1, +1, −1, −1, +1, −1, +1, +1, +1, −1, −1, +1, +1, +1, +1, a, b, +1, +1, a, −b, +1, a, −1, a, b, −1, −1, −a, b, −1, +1, −a, −b, −1, −1, −a, b, +1, −b, −1, a, b, −1, −1, −a, b, −1}.

A PAPR of the EHT-LTF sequence in the 80 MHz bandwidth in the 4x mode is 6.3675 dB.

EHT-LTF160 MHz_4x, EHT-LTF240 MHz_4x, and EHT-LTF320 MHz_4x may be separately constructed by using a method similar to that in Embodiment 1 based on the newly constructed EHT-LTF80 MHz_4x. A PAPR of the newly constructed EHT-LTF160 MHz_4x is 6.6551 dB, a PAPR of the newly constructed EHT-LTF240 MHz_4x is 7.3411 dB, and a PAPR of the newly constructed EHT-LTF320 MHz_4x is 8.2556 dB.

Optionally, the foregoing EHT-LTF80 MHz_4x may be directly buffered or stored locally. When used, EHT-LTF80 MHz_4x may be directly obtained locally.

It should be understood that, the foregoing method is merely an example for description, and this application is not limited thereto. Any method for obtaining the foregoing EHT-LTF80 MHz_4x falls within the protection scope of the embodiments of this application.

In Embodiment 3, further optimization may be performed on the basis of the sequences obtained in Embodiment 2.

A flood algorithm is used to optimize each sequence newly constructed in the foregoing Embodiment 2, to obtain the following optimized sequences.

EHT-LTF80 MHz_4x=$e^{\pi\sqrt{-1}}$×{0, 0, 1, 0, 1, 0, −0.99, 1, 1, 0, 1, 1, 1, 1, 0, 1, 0, 0, 0, 0, 0, 1, 1, 0, 0, 0, 0, 1, 0, 1, 0, 1, 1, 0, 0, 1, 0, 0, 0, 1, 1, 0, 1, 1, 1, 1, 0, 0, 0, 1, 1, 1, 1, 1, 1, 0, 0, 1, 0, 0, 0, 1, 0, 0, 0, 1, 0, 0, 1, 1, 1, 0, 1, 0, 1, 1, 0, 0, 1, 0, 1, 0, 0, 0, 0, 0, 1, 1, 0, 0, 0, 1, 0, 0, 1, 1, 1, 0, 1, 0, 0, 1, 0, 0, 1, 0, 1, 1, 0, 0, 0, 0, 1, 1, 0, 0, 0, 0, 0, 1, 0, 0, 1, 1, 1, 0, 1, 1, 1, 0, 1, 0, 1, 0, 0, 1, 0, 1, 0, 1, 0, 0, 0, 1, 0, 0, 0, 1, 1, 0, 0, 1, 1, 1, 1, 0, 0, 1, 1, 1, 1, 0, 1, 0, 1, 0, 0, 1, 1, 0, 1, 1, 1, 0, 0, 1, 0, 0, 0, 0, 1, 1, −0.99, 0, 0, 0, 0, 1, 0, 0, 0, 0, 0, 0, 0, 1, 0, 0, 0, 1, 0, 0, 1, 1, 1, 0, 1, 0, 1, 1, 0, 0, 1, 0, 1, 0, 0, 0, 0, 0, 1, 1, 0.13, 0, 0, 1, 0, 0, 1, 1, 1, 0, 1, 0, 0, 1, 0, 0, 1, 0, 1, 1, 0, 1, 0, 1, 0, 1, 0, 0, 0, 1, 0, 0, 0, 1, 1, 0, 1, 1, 1, 1, 1, 0, 0, 1, 1, 1, 1, 0, 1, 0, 1, 0, 0, 1, 1, 0, 1, 1, 1, 0, 0, 1, 0, 0, 0, 0, 1, 1, 1, 0, 0, 0, 0, 1, 0, 1, 1, 1, 1, 1, 1, 0, 1, 1, 1, 0, 1, 1, 0, 0, 0, 1, 0, 1, 0, 0, 1, 1, 0, 1, 0, 1, 1, 1, 1, 1, 0, 0, 1, 1, 1, 0, 1, 1, 0, 0, 0, 1, 0, 1, 1, 0, 1, 1, 0, 1, 0, 0, 0, 0, 0, 0, 1, 1, 0, 0, 0, 0, 1, 0, 0, 1, 1, 1, 0, 1, 1, −0.99, 0, 1, 0, 1, 0, 0, 1, 0, 1, 0, 1, 0, 0, 0, 1, 0, 0, 0, 1, 1, 0, 1, 1, 1, 1, 1, 0, 0, 1, 1, 1, 1, 0, 1, 0, 1, 0, 0, 1, 1, 0, 1, 1, 1, 0, 0, 1, 0, 0, 0, 0, 1, 1, 1, 0, 0, 0, 0, 1, 1, 0, 0, 0, 0, 0, 0, 1, 0, 0, 0, 1, 0, 0, 1, 1, 1, 0, 1, 0, 1, 1, 0, 0, 1, 0, 1, 0, 0, 0, 0, 0, 1, 0.99, 0, 0, 0, 1, 0, 0, 1, 1, 1, 0, 1, 0, 0, 1, 0, 0, 1, 0, 1, 1, 1, 0, 1, 0, 1, 1, 1, 1, 0, 0, 0, 1, 1, 0, 0, 0, 0, 0, 0, 0, 1, 1, 1, 1, 1, 1, 0, 0.9, 0, 0, 1, 1, 0, 0, 1, 0, 1, 0, 0, 1, 1, 0, 1, 0, 1, 1, 1, 0, 0, 1, 0, 0, 0, 1, 0, 0, 0, 0, 0, 0, 0, 1, 0, 1, 1, 0, 1, 1, 0, 1, 0, 0, 0, 1, 1, 0, 1, 1, 1, 0, 0, 1, 1, 1, 1, 1, 0, 1, 1, 1, 1, −0, 0, 0, 1, 1, 1, 1, 1, 0, 1, 1, 1, 0, 0, 1, 0, 0, 0, 1, 0, 1, 0, 1, 1, 1, 1, 1, 0, 0, 0, 1, 1, 1, 1, 0, 1, 1, 0, 0, 0, 1, 0, 0, 1, 0, 0, 1, 0, 1, 1, 1, 1, 1, 1, 1, 0, 0, 1, 1, 1, 0, 1, 1, 0, 0, 1, 1, 0, 1, 1, 0, 1, 1, 0, 1, 0, 0, 0, 1, 0, 1, 1, 0, 0, 1, 0, 1, 0, 0, 0, 1, 1, 0, 1, 1, 1, 0, 1, 1, 1, 1, 1, 1, 1, 0, 1, 0, 0, 1, 0, 0, 1, 0, 1, 1, 1, 0, 0, 1, 0, 0, 0, 1, 1, 0, 0, 0, 0, 1, 0, 1, 1, 1, 1, 0, 0, 1, 1, 1, 1, 1, 0, 1, 1, 0, 0, 0, 1, 0, 0, 0, 1, 0, 1, 0, 1, 1, 1, 1, 1, 0, 0, 0, 1, 1, 1, 1, 0, 1, 1, 0, 0, 0, 1, 0, 0, 1, 1, 0, 1, 0, 1, 0, 0, 0, 1, 0, 1, 1, 0, 0, 1, 0, 1, 0, 0, 0, 1, 1, 0, 1, 1, 1, 0, 1, 1, 1, 1, 1, 1, 1, 0, 1, 0, 0, 1, 0, 0, 1, 0, 1, 1, 1, 0, 0, 1, 0, 0, 0, 1, 1, 0, 0, 0, 0, 0, 1, 0, 0, 0, 0, 0, 1, 1, 0, 0, 0, 0, 0, 1, 0, 0, 1, 1, 1, 0, 1, 1, 1, 0, 1, 0, 1, 0, 0, 0, 0, 0, 1, 1, 1, 0, 0, 0, 0, 1, 0, 0, 1, 1, 1, 0, 1, 1, 0, 0, 1, 0, 1, 0, 1, 1, 1, 1, 1, 1, 0, 0, 1, 1, 1, 0, 1, 1, 0, 0, 0, 1, 0, 0.9, 1, 0, 1, 1, 0, 1, 0, 1, 0, 1, 0, 1, 1, 0, 0, 1, 0, 1, 0, 0, 0, 1, 1, 0, 1, 1, 1, 0, 1, 1, 1, 1, 1, 1, 1, 0, 1, 0, 0, 1, 0, 0, 1, 0, 1, 1, 1, 0, 0, 1, 0, 0, 0, 1, 1, 0, 0, 0, 0, 0, 1, 0, 1, 1, 1, 1, 0, 0, 1, 1, 1, 1, 1, 0, 1, 1, 0, 0, 0, 1, 0, 0, 0, 1, 0, 1, 0, 1, 1, 1, 1, 1, 0, 0, 0, 1, 1, 1, 1, 0, 1, 1, 0, 0, −0.1, 1, 0, 0, 1, 1, 0, 1, 0, 1, 0}.

A PAPR of optimized EHT-LTF80 MHz_4x is 5.8830 dB.

EHT-LTF160 MHz_4x={−1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1,

−1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, −1, 1, 1, 1, 1, −1, 1, 1, −1, −1, 1, −1, 1, −1, 0, 0, 0, 0, 0, 0, 0, 1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, 1, −1, 1, 1, 1, −1, −1, 1, −1, 1, 1, 1, 1, −1, 1, −1, −1, −1, 1, 1, −1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, 1, −1, −1, −1, −1, −1, 1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, 1, −1, −1, 1, 1, −1, 1, −1, −1, −1, −1, −1, −1, 1, −1, 1, 1, 1, −1, −1, 1, 1, 1, −1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, 1, −1, 1, −1, −1, −1, 1, 1, −1, −1, −1, −1, −1, −1, −1, 1, −1, −1, 1, 1, −1, 1, −1, −1, −1, −1, −1, −1, 1, 1, −1, −1, −1, 1, 1, 1, 1, −1, 1, 1, −1, −1, −1, 1, −1, 1, 1, 1, 1, 1, −1, 1, −1, −1, −1, 1, 1, −1, −1, −1, −1, 0, 0, 0, 0, 0, 0, 0, 0, 0, 0, 0, 0, 0, 0, 0, 0, 0, 0, 0, 0, 0, 0, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, 1, −1, 1, −1, −1, −1, 1, 1, −1, −1, −1, 1, 1, 1, 1, 1, 1, 1, −1, 1, −1, −1, 1, 1, 1, 1, −1, 1, −1, 1, 1, −1, −1, 1, −1, 1, −1, 1, −1, −1, 1, −1, 1, 1, 1, 1, −1, −1, 1, 1, 1, 1, 1, 1, 1, −1, 1, 1, −1, −1, 1, −1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, 1, −1, −1, 1, 1, 1, −1, −1, −1, −1, 1, −1, −1, 1, 1, −1,

1, −1, −1, −1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, −1, 1, 1, 1, 1, −1, 1, 1, −1, −1, 1, −1, 1, −1, 0, 0, 0, 0, 0, 0, 0, −1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, −1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1}.

A PAPR of optimized EHT-LTF160 MHz_4x is 6.3939 dB.

EHT-LTF240 MHz_4x=$e^{\pi\sqrt{-1}}$×{1, 0, 0, 0, 0, 1, 0, 0, 1, 1, 0, 1, 0, 1, 0, 1, 1, 0, 1, 0, 0, 0, 1, 1, 0, 0, 1, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 1, 0, 0, 1, 1, 0, 1, 0, −0.5, 0, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 1, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 1, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 0.75, 0, 1, 0, 0, 0, 0.875, 1, −0.125, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 0, 0, 1, 0, 1, 0, 1, 1, 1, 0, 0, 1, 1, 1, 0, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 1, 0, 0, 0, 0, 1, 0, 0, 1, 1, 0, 1, 0, 1, 0, 0, 0, 0, 0, 0, 0, 0, 1, 1, 0, 1, 0, 0, 0, 1, 1, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 0, 1, 1, 1, 1, 0, 1, 1, 1, 1, 0, 1, 1, 0, 1, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 1, 1, 1, 0, 1, 0, 0, 0, 0, 0, 1, 0, 1, 1, 1, 0, 0, 1, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 0, 1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 1, 0, 0, 1, 1, 0, 1, 0, 0, 0, 0, 0, 0, 1, 0, 1, 1, 1, 0, 0, 1, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 0, 0, 1, 0, 1, 1, 1, 0, 0, 1, 1, 1, 0, 1, 1, 1, 1, 0, 1, 1, 0, 0, 1, 0, 1, 0, 1, 0, 0, 1, 0, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 0, 1, 1, 0, 0, 0, 1, 0, 0, 0, 0, 1, 0, 0, 1, 1, 0, 1, 0, 1, 0, 0, 0, 0, 0, 0, 0, 1, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 1, 0, 1, 1, 0, 0, 1, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 1, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 0, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 0, 0, 0, 0, 0, 0, 0, 0, 0, 0, 0, 0, 0, 0, 0, 0, 0, 0, 0, 0, 0, 0, 0, 0, 1, 1, 1, 1, 1, 0, 1, 1, 0, 0, 1, 0, 1, 0, 1, 0, 0, 1, 0, 1, −0.5, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 1, 1, 1, 1, 1, 0, 1, 1, 0, 0, 1, 0, 1, 0, 0, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 1, 0, 0, 0, 1, 1, 0, 0, 0, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, −0.5, 1, 0, 1, −0.5, 0, 0, 1, 0, 1, 1, 1, 1, 1, 0, 1, 0, 0, 0, 1, 1, 0, 0, 0, 1, 1, 1, 1, 1, 1, 0, 1, 1, 0, 0, 1, 0, 1, 0, 1, 0, 0, 1, 0, 1, 1, 1, 0, 0, 1, 1, 1, 0.5, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 0.5, 1, 0, 0, 1, 1, 1, 0, 1, 1, 1, 1, 0, 1, 1, 0, 0, 1, 0, 1, 0, 0, 0, 0, 0, 0, 0, 0, 1, 0, 0, −0.5, 0, 1, 1, 1, 0, 0, 1, 1, 1, 1, 1, 1, 1, 1, 0, 1, 1, 0, 0, 1, 0, 1, 0, 1, 0, 0, 1, 0, −0.9375, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 1, 1, 1, 1, 1, 1, 0, 1, 1, 0, 0, 1, 0, 1, 0, 1, 0, 0, 1, 0, 1, 1, 1, 0, 0, 1, 1, 1, 0, 0, 0, 0, 1, 0, 0, 1, 1, 0, 1, 0, 0, 0, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 1, 0, 1, 1, 0, 0, 1, 0, 1, 0, 1, 0, 0, 1, 0, 1, 1, 1, 0, 0, 1, 1, 1, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 1, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 1, 0, 0, 1, 1, 0, 1, 0, 0, 0, 0, 0, 1, 0, 1, 1, 1, 0, 0, 1, 1, 1, 0, 0, 0, 0, 0, 0, 1, 0, 0, 1, 1, 0, 1, 0, 1, 0, 1, 1, 0, 1, 0, 0, 0, 1, 1, 0, 0, 0, 1, 1, 1, 1, 0, 1, 1, 0, 0, 1, 0, 1, 1, 1, 1, 1, 0, 1, 0, 0, 0, 1, 1, 0, 0, 0, 0, 0, 0, 0, 0, 1, 0, 0, 1, 1, 0, 1, 0, 1, 0, 1, 1, 0, 1, 0, 0, 0, 1, 1, 0, 0, 0, 0, 0, 0, 0, 0, 1, 0, 0, 1, 1, 0, 1, 0, 1, 0, 1, 0, 1, 1, 0, 1, 0, 0, 0, 1, 1, 0, 0, 0, 1, 1, 1, −0.5, 0, 1, 1, 0, 0, 1, 0, 1, 1, 1, 1, 1, 0, 1, 0, 0, 0, 1, 1, 0, 0, 0, 0}.

A PAPR of optimized EHT-LTF240 MHz_4x is 6.6898 dB.

EHT-LTF320 MHz_4x={−1, 1, −1, 1, 1, −1, 1, 1, −1, −1, −1, −1, 1, −1, 1, −1, −1, 1, −1, 1, 1, 1, −1, −1, 1, −1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, −1, 1, 1, 1, 1, −1, 1, 1, −1, −1, 1, −1, 1, −1, 0, 0, 0, 0, 0, 0, 0, 1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, 1, −1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, −1, −1, 1, 1, −1, 1, −1, 1, −1, −1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, 1, 1, 1, −1, 1, −1, −1, −1, 1, 1, −1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, 1, −1, 1, −1, −1, 1, −1, 1, 1, 1, −1, −1, 1, 1, 1, 1, 1, 1, −1, 1, 1, −1, −1, 1, −1, 1, 1, 1, 1, 1, −1, 1, −1, −1, −1, −1, 1, 1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, 0, 0, 0, 0, 0, 0, 0, 0, 0, 0, 0, 0, 0, 0, 0, 0, 0, 0, 0, 0, 0, 0, 0, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, 1, 1, 1, 1, 1, −1, 1, −1, −1, −1, 1, 1, −1, −1, −1, −1, −1, −1, −1, −1, −1, 1, 1, −1, −1, 1, 1, −1, 1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, −1, −1, 1, 1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, 1, −1, −1, 1, −1, 1, −1, −1, −1, −1, −1, 1, −1, 1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, −1, −1, 1, −1, 1, −1, 1, −1, −1, 1, −1, 1, −1, −1, −1, −1, 1, −1, −1, 1, 1, −1, 1, −1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, −1, 1, −1, 1, −1, −1, 1, 1, 1, −1, 1, 1, 1, 1, −1, 1, 1, −1, −1, 1, −1, 1, −1, 0, 0, 0, 0, 0, 0, 0, −1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1,

−1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, 1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, −1, 1, 1, 1, −1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, 1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 0, 0, 0, 0, 0, 0, 0, 0, 0, 0, 0, 0, 0, 0, 0, 0, 0, 0, 0, 0, 0, 0, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, 1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, 1, −1, 1, −1, −1, 1, 1, −1, 1, −1, 1, −1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, −1, −1, −1, −1, −1, −1, 1, −1, 1, −1, −1, −1, −1, −1, 1, −1, 1, 1, 1, −1, −1, 1, 1, 1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, −1, −1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, 1, −1, −1, 1, 1, −1, 1, −1, −1, 1, −1, −1, −1, −1, 1, 1, −1, 1, 1, 1, −1, −1, 1, 1, 1, −1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, 1, −1, −1, −1, 1, −1, −1, −1, −1, 1, −1, −1, 1, 1, −1, 1, −1, 1, 0, 0, 0, 0, 0, 0, 0, −1, 1, 1, −1, 1, −1, −1, −1, 1, 1, −1, −1, −1, −1, −1, −1, −1, −1, 1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, −1, −1, 1, −1, −1, 1, 1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, 1, −1, 1, −1, 1, 1, 1, 1, −1, 1, −1, −1, −1, −1, −1, 1, −1, 1, 1, 1, −1, −1, 1, −1, 1, −1, 1, −1, −1, −1, −1, −1, 1, −1, 1, 1, 1, −1, −1, 1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, −1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, 1, 1, 1, −1, −1, −1, −1, 1, −1, −1, 1, 1, −1, 1, −1, −1,

−1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 0, 0, 0, 0, 0, 0, 0, 0, 0, 0, 0, 0, 0, 0, 0, 0, 0, 0, 0, 0, 0, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, −1, 1, 1, 1, 1, −1, 1, 1, −1, −1, 1, −1, 1, −1, 0, 0, 0, 0, 0, 0, 0, −1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, −1, −1, −1, −1, −1, −1, 1, −1, −1, 1, 1, −1, 1, −1, 1, −1, 1, 1, −1, 1, −1, −1, −1, 1, 1, −1, −1, −1, 1, 1, 1, 1, −1, 1, 1, −1, −1, 1, −1, 1, 1, 1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, −1, 1, −1, −1, 1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, 1, 1, 1, −1, 1, −1, −1, 1, 1, −1, 1, −1, −1, −1, −1, −1, 1, −1, 1, 1, 1, −1, −1, 1, 1, 1, 1, −1, 1, 1, 1, 1, −1, 1, 1, −1, −1, 1, −1, 1, −1, 1, −1, 1, −1, 1, −1, −1, 1, 1, 1, 1, 1, 1, 1, 1, 1, −1, 1, 1, −1, −1, 1, −1, 1, 1, −1, −1, 1, −1, 1, 1, 1, 1, 1, −1, 1, −1, −1, −1, 1, 1, −1, −1, −1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, −1, 1, 1, −1, −1, 1, −1, 1, 1, 1, 1, 1, −1, 1, −1, −1, −1, 1, 1, −1, −1, −1, 1, −1, −1, −1, −1, 1, −1, −1, 1, 1, −1, 1, −1, 1, −1, 1, −1, 1, 1, −1, 1, −1, −1, −1, 1, 1, −1, −1, −1, −1, −1, −1, −1, 1, −1, −1, 1, 1, −1, 1, −1, −1, −1, −1, −1, 1, −1, 1, 1, 1, −1, −1, 1, 1, 1, 1, 1, 1, 1, 1, 1, −1, 1, 1, −1, −1, 1, −1, 1, −1, 1, −1, −1, 1, −1, 1, 1, 1, −1, −1, 1, 1, 1, −1, −1, −1, −1, 1, −1, 1, 1, 1, −1, 1, −1, −1, 1, 1, −1, 1, −1, −1, −1, −1, −1, 1, −1, 1, 1, 1, −1, −1, 1, 1, 1, 1}.

A PAPR of optimized EHT-LTF320 MHz_4x is 7.8652 dB.

In conclusion, performance analysis on the sequences obtained in the embodiments in Case 1 is as follows:

TABLE 1

| | Bandwidth (4×) | | |
|---|---|---|---|
| PAPR (dB) | Embodiment 1 (based on a sequence in IEEE 802.11ax) | Embodiment 2 (based on a Golay complementary pair) | Embodiment 3 (based on a flood algorithm) |
| 80 MHz | 6.2815 (IEEE 802.11ax) | 6.3675 | 5.8830 |
| 160 MHz | 6.9295 (IEEE 802.11ax) | 6.6551 | 6.3939 |
| 240 MHz | 7.8474 | 7.3411 | 6.6896 |
| 320 MHz | 8.9288 | 8.2556 | 7.8652 |

It can be learned from Table 1 that, for a channel bandwidth greater than 160 MHz, the PAPR of the sequence obtained in Embodiment 2 is lower than the PAPR of the sequence obtained in Embodiment 1, and the PAPR of the sequence obtained in Embodiment 3 is lower than the PAPR of the sequence obtained in Embodiment 2. In Embodiment 1, a new sequence is constructed by using a sequence in the existing IEEE 802.11ax standard, so that compatibility is higher and implementation is easy. In Embodiment 2 and Embodiment 3, a sequence in the 80 MHz bandwidth is newly constructed by using a Golay complementary pair, and a new sequence is constructed based on the newly constructed sequence, so that a sequence with a relatively low PAPR and relatively good performance can be obtained, thereby improving spectrum utilization of the system.

Case 2: A transmission mode is 1x.

In Embodiment 4, a sequence in IEEE 802.11ax may be used to construct a sequence in IEEE 802.11be, so that compatibility is higher and implementation is easy.

1. An 80 MHz sequence in IEEE 802.11ax is used for construction.

Similar to Case 1, an LTF sequence in the 80 MHz bandwidth in the 1x mode in IEEE 802.11ax may be denoted as HE-LTF80 MHz_1x, and HE-LTF80 MHz_1x={HE-LTF80 MHz_left_1x, 0, HE-LTF80 MHz_right_1x}. HE-LTF80 MHz_1x' is constructed first to construct another sequence. Specifically, HE-LTF80 MHz_1x' is constructed based on HE-LTF80 MHz_1x. HE-LTF80 MHz_1x'={HE-LTF80 MHz_left_1x, 0, −HE-LTF80 MHz_right_1x}. For the sequence in IEEE 802.11ax, refer specifically to the foregoing description. Details are not described herein again.

(1) An LTF sequence in the 160 MHz bandwidth in the 1x mode is constructed, and denoted as EHT-LTF160 MHz_1x.

In a possible implementation, EHT-LTF160 MHz_1x is made to meet: EHT-LTF160 MHz_1x={±HE-LTF80 MHz_1x, $0_{23}$, ±HE-LTF80 MHz_1x'}. PAPRs of all possible sequences are traversed through computer-based searching, and a sequence with a relatively low PAPR is selected from all the possible sequences, so that the following can be determined:

EHT-LTF160 MHz_1x={HE-LTF80 MHz_1x, $0_{23}$, HE-LTF80 MHz_1x'}; or

EHT-LTF160 MHz_1x={−HE-LTF80 MHz_1x, $0_{23}$, −HE-LTF80 MHz_1x'}.

A PAPR of the EHT-LTF sequence in the 160 MHz bandwidth in the 1x mode is 4.8623 dB.

(2) An LTF sequence in the 240 MHz bandwidth in the 1x mode is constructed, and denoted as EHT-LTF240 MHz_1x.

In a possible implementation, EHT-LTF240 MHz_1x is made to meet: EHT-LTF240 MHz_1x={±HE-LTF80 MHz_left_1x, $0_{23}$, ±HE-LTF80 MHz_right_1x, $0_{23}$, ±HE-LTF80 MHz_left_1x, 0, ±HE-LTF80 MHz_right_1x, $0_{23}$, ±HE-LTF80 MHz_left_1x, $0_{23}$, ±HE-LTF80 MHz_right_1x}. PAPRs of all possible sequences are traversed through computer-based searching, and a sequence with a relatively low PAPR is selected from all the possible sequences, so that the following can be determined:

EHT-LTF240 MHz_1x={HE-LTF80 MHz_left_1x, $0_{23}$, HE-LTF80 MHz_right_1x, $0_{23}$, HE-LTF80 MHz_left_1x, 0, HE-LTF80 MHz_right_1x, $0_{23}$, –HE-LTF80 MHz_left_1x, $0_{23}$, –HE-LTF80 MHz_right_1x}; or EHT-LTF240 MHz_1x={–HE-LTF80 MHz_left_1x, $0_{23}$, –HE-LTF80 MHz_right_1x, $0_{23}$, –HE-LTF80 MHz_left_1x, 0, –HE-LTF80 MHz_right_1x, $0_{23}$, HE-LTF80 MHz_left_1x, $0_{23}$, HE-LTF80 MHz_right_1x}.

A PAPR of the EHT-LTF sequence in the 240 MHz bandwidth in the 1x mode is 6.3317 dB.

In a possible implementation, EHT-LTF240 MHz_1x is made to meet: EHT-LTF240 MHz_1x={±HE-LTF80 MHz_1x, $0_{23}$, ±HE-LTF80 MHz_1x, $0_{23}$, ±HE-LTF80 MHz_1x}. PAPRs of all possible sequences are traversed through computer-based searching, and a sequence with a relatively low PAPR is selected from all the possible sequences, so that the following can be determined:

EHT-LTF240 MHz_1x={HE-LTF80 MHz_1x, $0_{23}$, HE-LTF80 MHz_1x, $0_{23}$, –HE-LTF80 MHz_1x}.

A PAPR of the EHT-LTF sequence in the 240 MHz bandwidth in the 1x mode is 6.3317 dB.

(3) An LTF sequence in the 320 MHz bandwidth in the 1x mode is constructed, and denoted as EHT-LTF320 MHz_1x.

In a possible implementation, EHT-LTF320 MHz_1x is made to meet: EHT-LTF320 MHz_4x={±HE-LTF80 MHz_1x, $0_{23}$, ±HE-LTF80 MHz_1x, $0_{23}$, ±HE-LTF80 MHz_1x, $0_{23}$, ±HE-LTF80 MHz_1x}. PAPRs of all possible sequences are traversed through computer-based searching, and a sequence with a relatively low PAPR is selected from all the possible sequences, so that the following can be determined:

EHT-LTF320 MHz_1x={HE-LTF80 MHz_1x, $0_{23}$, HE-LTF80 MHz_1x, $0_{23}$, HE-LTF80 MHz_1x, $0_{23}$, –HE-LTF80 MHz_1x}; or

EHT-LTF320 MHz_1x={–HE-LTF80 MHz_1x, $0_{23}$, –HE-LTF80 MHz_1x, $0_{23}$, –HE-LTF80 MHz_1x, $0_{23}$, HE-LTF80 MHz_1x}; or

EHT-LTF320 MHz_1x={HE-LTF80 MHz_1x, $0_{23}$, HE-LTF80 MHz_1x, $0_{23}$, –HE-LTF80 MHz_1x, $0_{23}$, HE-LTF80 MHz_1x}; or

EHT-LTF320 MHz_1x={–HE-LTF80 MHz_1x, $0_{23}$, –HE-LTF80 MHz_1x, $0_{23}$, HE-LTF80 MHz_1x, $0_{23}$, –HE-LTF80 MHz_1x}; or

EHT-LTF320 MHz_1x={HE-LTF80 MHz_1x, $0_{23}$, –HE-LTF80 MHz_1x, $0_{23}$, HE-LTF80 MHz_1x, $0_{23}$, HE-LTF80 MHz_1x}; or

EHT-LTF320 MHz_1x={–HE-LTF80 MHz_1x, $0_{23}$, HE-LTF80 MHz_1x, $0_{23}$, –HE-LTF80 MHz_1x, $0_{23}$, –HE-LTF80 MHz_1x}; or

EHT-LTF320 MHz_1x={–HE-LTF80 MHz_1x, $0_{23}$, HE-LTF80 MHz_1x, $0_{23}$, HE-LTF80 MHz_1x, $0_{23}$, HE-LTF80 MHz_1x}; or

EHT-LTF320 MHz_1x={HE-LTF80 MHz_1x, $0_{23}$, –HE-LTF80 MHz_1x, $0_{23}$, –HE-LTF80 MHz_1x, $0_{23}$, –HE-LTF80 MHz_1x}.

A PAPR of the EHT-LTF sequence in the 320 MHz bandwidth in the 1x mode is 5.0022 dB.

2. A 160 MHz sequence and an 80 MHz sequence in IEEE 802.11ax are used for construction.

In this embodiment of this application, an LTF sequence in the 160 MHz bandwidth in the 1x mode in IEEE 802.11ax is denoted as HE-LTF160 MHz_1x, and HE-LTF160 MHz_1x={HE-LTF160 MHz_left_1x, 0, HE-LTF160 MHz_right_1x}. HE-LTF160 MHz_1x' is constructed first to construct another sequence. Specifically, HE-LTF160 MHz_1x' is constructed based on HE-LTF160 MHz_1x. HE-LTF160 MHz_1x'={HE-LTF160 MHz_left_1x, 0, –HE-LTF160 MHz_right_1x}. For the sequence in IEEE 802.11ax, refer specifically to the foregoing description. Details are not described herein again.

(1) An LTF sequence in the 240 MHz bandwidth in the 1x mode is constructed, and denoted as EHT-LTF240 MHz_1x.

In a possible implementation, EHT-LTF240 MHz_1x is made to meet: EHT-LTF240 MHz_4x={±HE-LTF160 MHz_1x, $0_{23}$, ±HE-LTF80 MHz_1x}. PAPRs of all possible sequences are traversed through computer-based searching, and a sequence with a relatively low PAPR is selected from all the possible sequences, so that the following can be determined:

EHT-LTF240 MHz_1x={HE-LTF160 MHz_1x, $0_{23}$, –HE-LTF80 MHz_1x}; or

EHT-LTF240 MHz_1x={–HE-LTF160 MHz_1x, $0_{23}$, HE-LTF80 MHz_1x}.

A PAPR of the EHT-LTF sequence in the 240 MHz bandwidth in the 1x mode is 6.6482 dB.

In a possible implementation, EHT-LTF240 MHz_1x is made to meet: EHT-LTF240 MHz_4x={±HE-LTF160 MHz_1x', $0_{23}$, ±HE-LTF80 MHz_1x}. PAPRs of all possible sequences are traversed through computer-based searching, and a sequence with a relatively low PAPR is selected from all the possible sequences, so that the following can be determined:

EHT-LTF240 MHz_1x={HE-LTF160 MHz_1x', $0_{23}$, –HE-LTF80 MHz_1x}; or

EHT-LTF240 MHz_1x={–HE-LTF160 MHz_1x', $0_{23}$, HE-LTF80 MHz_1x}.

A PAPR of the EHT-LTF sequence in the 240 MHz bandwidth in the 1x mode is 6.3570 dB.

In a possible implementation, EHT-LTF240 MHz_1x is made to meet: EHT-LTF240 MHz_4x={±HE-LTF160 MHz_1x, $0_{23}$, ±HE-LTF160 MHz_1x'}. PAPRs of all possible sequences are traversed through computer-based searching, and a sequence with a relatively low PAPR is selected from all the possible sequences, so that the following can be determined:

EHT-LTF240 MHz_1x={HE-LTF160 MHz_1x, $0_{23}$, –HE-LTF160 MHz_1x'}; or

EHT-LTF240 MHz_1x={–HE-LTF160 MHz_1x, $0_{23}$, HE-LTF160 MHz_1x'}.

A PAPR of the EHT-LTF sequence in the 240 MHz bandwidth in the 1x mode is 6.3570 dB.

In a possible implementation, EHT-LTF240 MHz_1x is made to meet: EHT-LTF240 MHz_4x={+HE-LTF80 MHz_1x, $0_{23}$, ±HE-LTF160 MHz_1x}. PAPRs of all possible sequences are traversed through computer-based searching, and a sequence with a relatively low PAPR is selected from all the possible sequences, so that the following can be determined:

EHT-LTF240 MHz_1x={HE-LTF80 MHz_1x, $0_{23}$, –HE-LTF160 MHz_1x}; or

EHT-LTF240 MHz_1x={–HE-LTF80 MHz_1x, $0_{23}$, HE-LTF160 MHz_1x}.

A PAPR of the EHT-LTF sequence in the 240 MHz bandwidth in the 1x mode is 6.6482 dB.

(2) An LTF sequence in the 320 MHz bandwidth in the 1x mode is constructed, and denoted as EHT-LTF320 MHz_1x.

In a possible implementation, EHT-LTF320 MHz_1x is made to meet: EHT-LTF320 MHz_1x={±HE-LTF160 MHz_1x, $0_{23}$, ±HE-LTF160 MHz_1x'}. PAPRs of all possible sequences are traversed through computer-based searching, and a sequence with a relatively low PAPR is selected from all the possible sequences, so that the following can be determined:

EHT-LTF320 MHz_1x={HE-LTF160 MHz_1x, $0_{23}$, HE-LTF160 MHz_1x'}; or

EHT-LTF320 MHz_1x={−HE-LTF160 MHz_1x, $0_{23}$, −HE-LTF160 MHz_1x'}.

A PAPR of the EHT-LTF sequence in the 320 MHz bandwidth in the 1x mode is 5.2021 dB.

In another possible implementation, EHT-LTF320 MHz_1x is made to meet: EHT-LTF320 MHz_1x={±HE-LTF160 MHz_1x, $0_{23}$, ±HE-LTF160 MHz_1x}. PAPRs of all possible sequences are traversed through computer-based searching, and a sequence with a relatively low PAPR is selected from all the possible sequences, so that the following can be determined:

EHT-LTF320 MHz_1x={HE-LTF160 MHz_1x, $0_{23}$, HE-LTF160 MHz_1x}; or

EHT-LTF320 MHz_1x={−HE-LTF160 MHz_1x, $0_{23}$, −HE-LTF160 MHz_1x}.

A PAPR of the EHT-LTF sequence in the 320 MHz bandwidth in the 1x mode is 7.8726 dB.

In Embodiment 5, a new sequence may be used to construct a sequence in IEEE 802.11be to obtain a more optimal LTF sequence.

An 80 MHz sequence is constructed by using a Boolean function set.

For example, the 80 MHz sequence may be constructed according to the following steps.

Step 1. Define a quadratic Boolean function set Func:

$$Func = \left\{ f(x_1,\ x_2,\ \ldots\ x_7) = \sum_{i=1}^{6} x_i x_{i+1} + \sum_{i=1}^{7} \lambda_i x_{i+1} \mid \lambda_i \in F_2 \right\}$$

Step 2. Traverse Func to extract a function $f(x_1, x_2, \ldots x_7)$. Construct $g(x_1, x_2, \ldots x_7) = f + x_1$ by using $f(x_1, x_2, \ldots x_7)$. Calculate truth tables of the functions $f(x_1, x_2, \ldots x_7)$ and $g(x_1, x_2, \ldots x_7)$, and denote the truth tables as sequences $\bar{f}$ and $\bar{g}$. Make $a=(-1)^{\bar{f}}$ and $b=(-1)^{\bar{g}}$. In this case, a sequence pair (a,b) is a binary Golay complementary pair.

Step 3. Define seq125a=a(2:126), seq125b=b(2:126), and seq251={seq125a, 0, seq125b}, where a(2:126) indicates that the $2^{nd}$ to the $126^{th}$ bits of sequence a are taken, and b(2:126) indicates that the $2^{nd}$ to the 126th bits of sequence b are taken.

Step 4. Perform a zero-insertion operation on the sequence seq251, that is, insert three 0s between every two elements, to obtain a to-be-selected LTF sequence seq1001 in the 80 MHz bandwidth in the 1x mode.

Step 5: Because the Boolean function set Func has a total of 128 functions, 128 seq1001 can be obtained in total, and a sequence with a lowest comprehensive PAPR can be obtained through computer-based searching. In this embodiment of this application, a finally obtained LTF sequence in the 80 MHz bandwidth in the 1x mode is denoted as EHT-LTF80 MHz_1x.

EHT-LTF80 MHz_1x={1, 0, 0, 0, −1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, −1, 0, 0, 0, 1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, −1, 0, 0, 0, 1, 0, 0, 0, 1, 0, 0, 0, 1, 0, 0, 0, 1, 0, 0, 0, −1, 0, 0, 0, 1, 0, 0, 0, 1, 0, 0, 0, −1, 0, 0, 0, 1, 0, 0, 0, −1, 0, 0, 0, −1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, −1, 0, 0, 0, 1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, 0, 0, 0, 0, 1, 0, 0, 0, −1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, −1, 0, 0, 0, 1, 0, 0, 0, 1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, 1, 0, 0, 0, 1, 0, 0, 0, −1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 1, 0, 0, 0, 1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, −1, 0, 0, 0, 1, 0, 0, 0, 1, 0, 0, 0, 1, 0, 0, 0, −1, 0, 0, 0, 1, 0, 0, 0, −1, 0, 0, 0, −1, 0, 0, 0, −1, 0, 0, 0, 1, 0, 0, 0, −1, 0, 0, 0, −1, 0, 0, 0, 1, 0, 0, 0, −1, 0, 0, 0, 0, −1, 0, 0, 0, −1, 0, 0, 0, −1, 0, 0, 0, 1, 0, 0, 0, 1, 0, 0, 0, 1, 0, 0, 0, −1, 0, 0, 0, 1, 0, 0, 0, −1, 0, 0, 0, −1, 0, 0, 0, −1, 0, 0, 0, 1, 0, 0, 0, 1, 0, 0, 0, 1, 0, 0, 0, −1, 0, 0, 0, 1, 0, 0, 0, 1, 0, 0, 0, 1}.

A PAPR of the foregoing newly constructed EHT-LTF sequence in the 80 MHz bandwidth in the 1x mode is 4.1087 dB.

EHT-LTF160 MHz_1x, EHT-LTF240 MHz_1x, and EHT-LTF320 MHz_1x may be separately constructed by using a method similar to that in Embodiment 1 based on the newly constructed LTF80 MHz_1x.

EHT-LTF160 MHz_1x={EHT-LTF80 MHz_1x, $0_{23}$, EHT-LTF80 MHz_1x'}; or

EHT-LTF160 MHz_1x={-EHT-LTF80 MHz_1x, $0_{23}$, −EHT-LTF80 MHz_1x'}.

A PAPR of the foregoing newly constructed EHT-LTF sequence in the 160 MHz bandwidth in the 1x mode is 4.6977 dB.

EHT-LTF240 MHz_1x={EHT-LTF80 MHz_1x, $0_{23}$, EHT-LTF80 MHz_1x, $0_{23}$, −EHT-LTF80 MHz_1x}; or

EHT-LTF240 MHz_1x={-EHT-LTF80 MHz_1x, $0_{23}$, −EHT-LTF80 MHz_1x, $0_{23}$, EHT-LTF80 MHz_1x}.

A PAPR of the foregoing newly constructed EHT-LTF sequence in the 240 MHz bandwidth in the 1x mode is 6.4813 dB.

EHT-LTF320 MHz_1x={EHT-LTF160 MHz_1x, $0_{23}$, EHT-LTF160 MHz_1x'}; or

EHT-LTF320 MHz_1x={-EHT-LTF160 MHz_1x, $0_{23}$, −EHT-LTF160 MHz_1x'}.

A PAPR of the foregoing newly constructed EHT-LTF sequence in the 320 MHz bandwidth in the 1x mode is 5.8346 dB.

Optionally, the foregoing EHT-LTF80 MHz_1x and/or EHT-LTF160 MHz_1x may be directly buffered or stored locally. When used, EHT-LTF80 MHz_1x and/or EHT-LTF160 MHz_1x may be directly obtained locally.

It should be understood that, the foregoing method is merely an example for description, and this application is not limited thereto. Any method for obtaining the foregoing EHT-LTF80 MHz_1x and/or EHT-LTF160 MHz_1x falls within the protection scope of the embodiments of this application.

In conclusion, performance analysis on the sequences obtained in the embodiments in Case 2 is as follows:

TABLE 2

| PAPR (dB) | Bandwidth (1×) | |
|---|---|---|
| | Embodiment 4 (based on a sequence in IEEE 802.11ax) | Embodiment 5 (based on a Golay complementary pair) |
| 80 MHz | 4.5687 (IEEE 802.11ax) | 4.1087 |
| 160 MHz | 4.8623 (IEEE 802.11ax) | 4.6977 |
| 240 MHz | 6.3317 | 6.4813 |
| 320 MHz | 5.0022 | 5.8346 |

It can be learned from Table 2 that, for a channel bandwidth greater than or equal to 160 MHz, the PAPR of the sequence obtained in Embodiment 5 is lower than the PAPR of the sequence obtained in Embodiment 4. In Embodiment 4, a new sequence is constructed by using a sequence in the existing IEEE 802.11ax standard, so that compatibility is higher and implementation is easy. In Embodiment 5, a sequence in the 80 MHz bandwidth is newly constructed by using the Boolean function set, and a new sequence is constructed based on the newly constructed sequence, so that a sequence with a relatively low PAPR and relatively good performance can be obtained, thereby improving spectrum utilization of the system.

Case 3: A transmission mode is 2x.

In Case 3, a sequence in IEEE 802.11ax may be used to construct a sequence in IEEE 802.11be, so that compatibility is higher.

1. An 80 MHz sequence in IEEE 802.11ax is used for construction.

In this embodiment of this application, an LTF sequence in the 80 MHz bandwidth in the 2x mode in IEEE 802.11ax may be denoted as HE-LTF80 MHz_2x, and HE-LTF80 MHz_2x={HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$}. For the sequence in IEEE 802.11ax, refer specifically to the foregoing description. Details are not described herein again.

(1) An LTF sequence in the 160 MHz bandwidth in the 2x mode is constructed, and denoted as EHT-LTF160 MHz_2x.

In a possible implementation, EHT-LTF160 MHz_2x is made to meet: EHT-LTF160 MHz_2x={+HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $0_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$}. PAPRs of all possible sequences are traversed through computer-based searching, and a sequence with a relatively low PAPR is selected from all the possible sequences, so that the following can be determined:

EHT-LTF160 MHz_2x={HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}; or EHT-LTF160 MHz_2x={−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}.

A PAPR of the EHT-LTF sequence in the 160 MHz bandwidth in the 2x mode is 6.2436 dB.

In another possible implementation, EHT-LTF160 MHz_2x is made to meet: EHT-LTF160 MHz_2x={+HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, +HE-LTF$_{80\ MHz_part5_2x}$, $0_{23}$, ±HE-LTF$_{80\ MHz_part1_2x}$, +HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$}. PAPRs of all possible sequences are traversed through computer-based searching, and the following sequence can be obtained from all the possible sequences:

EHT-LTF160 MHz_2x={HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}; or EHT-LTF160 MHz_2x={−HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}.

A PAPR of the EHT-LTF sequence in the 160 MHz bandwidth in the 2x mode is 6.6341 dB.

(2) An LTF sequence in the 240 MHz bandwidth in the 2x mode is constructed, and denoted as EHT-LTF240 MHz_2x.

In a possible implementation, EHT-LTF240 MHz_2x is made to meet: EHT-LTF240 MHz_2x={±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part3_2x}$, $0_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, HE-LTF$_{80\ MHz_part5_2x}$, $0_{23}$, +HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_parts_2x}$}. PAPRs of all possible sequences are traversed through computer-based searching, and a sequence with a relatively low PAPR is selected from all the possible sequences, so that the following can be determined:

EHT-LTF240 MHz_2x={HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}; or EHT-LTF240 MHz_2x={-HE-LTF$_{80\ MHz_part1_2x}$, HE-LTF$_{80\ MHz_part2_2x}$, −HE-LTF$_{80\ MHz_part3_2x}$, HE- LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}.

A PAPR of the EHT-LTF sequence in the 240 MHz bandwidth in the 2x mode is 7.1771 dB.

(3) An LTF sequence in the 320 MHz bandwidth in the 2x mode is constructed, and denoted as EHT-LTF320 MHz_2x.

In a possible implementation, EHT-LTF320 MHz_2x is made to meet: EHT-LTF$_{320\ MHz_2x}$={±HE-LTF$_{80\ MHz_part1_2x}$, HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $O_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $O_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $O_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$}. PAPRs of all possible sequences are traversed through computer-based searching, and a sequence with a relatively low PAPR is selected from all the possible sequences, so that the following can be determined:

EHT-LTF320 MHz_2x={HE-LTF$_{80\ MHz_part1_2x}$, HE-LTF$_{80\ MHz_part2_2x}$, HE LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$}; or EHT-LTF320 MHz_2x={−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$}.

A PAPR of the EHT-LTF sequence in the 320 MHz bandwidth in the 2x mode is 7.5506 dB.

In another possible implementation, EHT-LTF320 MHz_2x is made to meet: EHT-LTF320 MHz_2x={±HE-LTF$_{80\ MHz_part1_2x}$, ±HE-LTF$_{80\ MHz_part2_2x}$, +HE-LTF$_{80\ MHz_part3_2x}$, ±HE-LTF$_{80\ MHz_part4_2x}$, ±HE-LTF$_{80\ MHz_part5_2x}$, $0_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $0_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$, $0_{23}$, ±HE-LTF$_{80\ MHz_part1_2x}$, ±HE-LTF$_{80\ MHz_part2_2x}$, ±HE-LTF$_{80\ MHz_part3_2x}$, ±HE-LTF$_{80\ MHz_part4_2x}$, ±HE-LTF$_{80\ MHz_part5_2x}$}. PAPRs of all possible sequences are traversed through computer-based searching, and the following sequence can be selected from all the possible sequences:

EHT-LTF320 MHz_2x={HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}; or EHT-LTF320 MHz_2x={−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}.

A PAPR of the EHT-LTF sequence in the 320 MHz bandwidth in the 2x mode is 8.1128 dB.

In a possible implementation, when a small searching range is considered, the following sequence can be obtained:

EHT-LTF320 MHz_2x={HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}; or EHT-LTF320 MHz_2x={−HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}.

A PAPR of the EHT-LTF sequence in the 320 MHz bandwidth in the 2x mode is 6.9188 dB.

Optionally, the foregoing sequence may be compatible with a case of 240 MHz. The 240 MHz may be obtained by concatenating three consecutive 80 MHz, or may be obtained by concatenating three non-consecutive 80 MHz. This is not limited in this embodiment of this application.

2. A 160 MHz sequence and an 80 MHz sequence in IEEE 802.11ax are used for construction.

In this embodiment of this application, an LTF sequence in the 80 MHz bandwidth in the 2x mode in IEEE 802.11ax may be denoted as HE-LTF80 MHz_2x, and an LTF sequence in the 160 MHz bandwidth in the 2x mode in IEEE 802.11ax may be denoted as HE-LTF160 MHz_2x. For the sequence in IEEE 802.11ax, refer specifically to the foregoing description. Details are not described herein again.

(1) An LTF sequence in the 240 MHz bandwidth in the 2x mode is constructed, and denoted as EHT-LTF240 MHz_2x.

In a possible implementation, EHT-LTF240 MHz_2x is made to meet: EHT-LTF240 MHz_2x={±HE-LTF80 MHz_2x, $0_{23}$, ±HE-LTF160 MHz_2x}. PAPRs of all possible sequences are traversed through computer-based searching, and a sequence with a relatively low PAPR is selected from all the possible sequences, so that the following can be determined:

EHT-LTF240 MHz_2x={HE-LTF80 MHz_2x, $0_{23}$, −HE-LTF160 MHz_2x}; or

EHT-LTF240 MHz_2x={−HE-LTF80 MHz_2x, $0_{23}$, HE-LTF160 MHz_2x}.

A PAPR of the LTF sequence in the 240 MHz bandwidth in the 2x mode is 7.8417 dB.

In a possible implementation, EHT-LTF240 MHz_2x is made to meet: EHT-LTF240 MHz_2x={±HE-LTF160 MHz_2x, $0_{23}$, ±HE-LTF80 MHz_2x}. PAPRs of all possible sequences are traversed through computer-based searching, and a sequence with a relatively low PAPR is selected from all the possible sequences, so that the following can be determined:

EHT-LTF240 MHz_2x={HE-LTF160 MHz_2x, $0_{23}$, −HE-LTF80 MHz_2x}; or

EHT-LTF240 MHz_2x={−HE-LTF160 MHz_2x, $0_{23}$, HE-LTF80 MHz_2x}.

A PAPR of the LTF sequence in the 240 MHz bandwidth in the 2x mode is 7.8106 dB.

In a possible implementation, EHT-LTF240 MHz_2x is made to meet: EHT-LTF240 MHz_2x={±HE-LTF80 MHz_2x, $0_{23}$, ±HE-LTF80 MHz_2x, $0_{23}$, ±HE-LTF80 MHz_2x}. PAPRs of all possible sequences are traversed through computer-based searching, and a sequence with a relatively low PAPR is selected from all the possible sequences, so that the following can be determined:

EHT-LTF240 MHz_2x={HE-LTF80 MHz_2x, $0_{23}$, −HE-LTF80 MHz_2x, $0_{23}$, HE-LTF80 MHz_2x}; or

EHT-LTF240 MHz_2x={−HE-LTF80 MHz_2x, $0_{23}$, HE-LTF80 MHz_2x, $0_{23}$, −HE-LTF80 MHz_2x}.

A PAPR of the LTF sequence in the 240 MHz bandwidth in the 2x mode is 7.8417 dB.

(2) An LTF sequence in the 320 MHz bandwidth in the 2x mode is constructed, and denoted as EHT-LTF320 MHz_2x.

In a possible implementation, EHT-LTF320 MHz_2x is made to meet: EHT-LTF240 MHz_2x={±HE-LTF160 MHz_2x, $0_{23}$, ±HE-LTF160 MHz_2x}. PAPRs of all possible sequences are traversed through computer-based searching, and a sequence with a relatively low PAPR is selected from all the possible sequences, so that the following can be determined:

EHT-LTF320 MHz_2x={HE-LTF160 MHz_2x, $0_{23}$, −HE-LTF160 MHz_2x}; or

EHT-LTF320 MHz_2x={−HE-LTF160 MHz_2x, $0_{23}$, HE-LTF160 MHz_2x}.

A PAPR of the LTF sequence in the 320 MHz bandwidth in the 2x mode is 9.6810 dB.

In a possible implementation, EHT-LTF320 MHz_2x is made to meet: EHT-LTF240 MHz_2x={±HE-LTF160 MHz_2x, $0_{23}$, ±HE-LTF160 MHz_2x}. PAPRs of all possible sequences are traversed through computer-based searching, and a sequence with a relatively low PAPR is selected from all the possible sequences, so that the following can be determined:

EHT-LTF320 MHz_2x={HE-LTF160 MHz_2x, $0_{23}$, HE-LTF160 MHz_2x}; or

EHT-LTF320 MHz_2x={−HE-LTF160 MHz_2x, $0_{23}$, −HE-LTF160 MHz_2x}.

A PAPR of the LTF sequence in the 320 MHz bandwidth in the 2x mode is 9.3908 dB.

In a possible implementation, EHT-LTF320 MHz_2x is made to meet: EHT-LTF320 MHz_2x={±HE-LTF80 MHz_2x, $0_{23}$, ±HE-LTF80 MHz_2x, $0_{23}$, ±HE-LTF80 MHz_2x, $0_{23}$, ±HE-LTF80 MHz_2x}. PAPRs of all possible sequences are traversed through computer-based searching, and a sequence with a relatively low PAPR is selected from all the possible sequences, so that the following can be determined:

EHT-LTF320 MHz_2x={HE-LTF80 MHz_2x, $0_{23}$, −HE-LTF80 MHz_2x, $0_{23}$, −HE-LTF80 MHz_2x, $0_{23}$, HE-LTF80 MHz_2x}; or

EHT-LTF320 MHz_2x={−HE-LTF80 MHz_2x, $0_{23}$, HE-LTF80 MHz_2x, $0_{23}$, HE-LTF80 MHz_2x, $0_{23}$, −HE-LTF80 MHz_2x}; or

EHT-LTF320 MHz_2x={HE-LTF80 MHz_2x, $0_{23}$, HE-LTF80 MHz_2x, $0_{23}$, −HE-LTF80 MHz_2x, $0_{23}$, −HE-LTF80 MHz_2x}; or

EHT-LTF320 MHz_2x={−HE-LTF80 MHz_2x, $0_{23}$, −HE-LTF80 MHz_2x, $0_{23}$, HE-LTF80 MHz_2x, $0_{23}$, HE-LTF80 MHz_2x}.

A PAPR of the LTF sequence in the 320 MHz bandwidth in the 2x mode is 9.0869 dB.

Optionally, the foregoing sequence may be compatible with a case of 240 MHz. The 240 MHz may be obtained by concatenating three consecutive 80 MHz, or may be obtained by concatenating three non-consecutive 80 MHz. This is not limited in this embodiment of this application.

In this embodiment of this application, a new sequence is constructed by using a sequence in the existing IEEE 802.11ax standard, so that compatibility is higher and implementation is easy. A sequence with a relatively low PAPR and relatively good performance can be obtained, thereby improving spectrum utilization of the system.

The foregoing describes in detail the method for transmitting a physical layer protocol data unit provided in the embodiments of this application with reference to FIG. 1 to FIG. 5.

An embodiment of this application provides an apparatus for transmitting a physical layer protocol data unit. In a possible implementation, the apparatus is configured to implement the steps or procedures corresponding to the receive end in the foregoing method embodiments. In another possible implementation, the apparatus is configured to implement the steps or procedures corresponding to the transmit end in the foregoing method embodiments.

Figure 6:
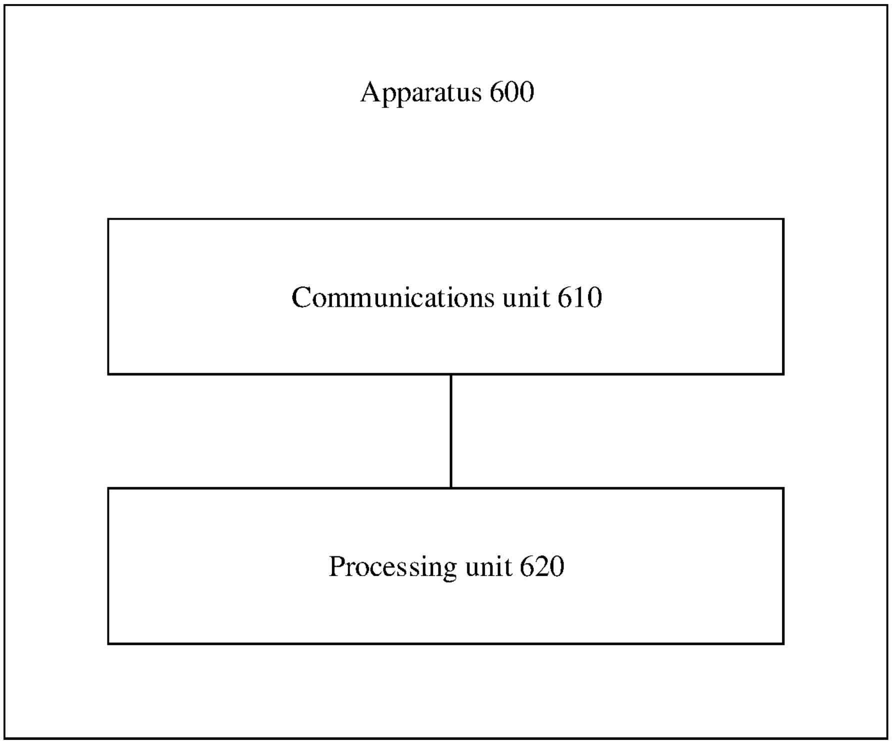
FIG. 6 is a schematic block diagram of an apparatus for transmitting a physical layer protocol data unit according to an embodiment of this application.
Figure 7:
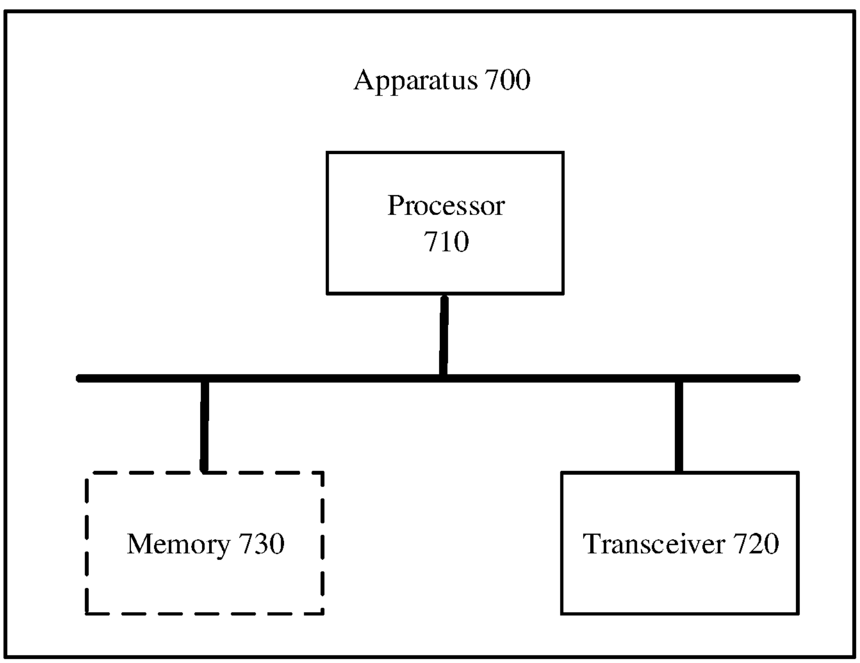
FIG. 7 is another schematic block diagram of an apparatus for transmitting a physical layer protocol data unit according to an embodiment of this application.
Figure 8:
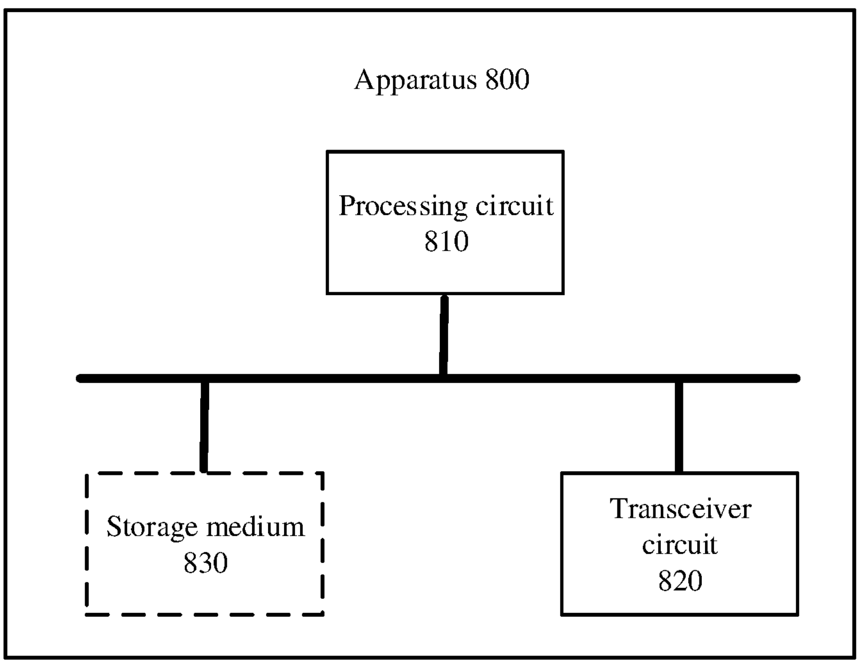
FIG. 8 is still another schematic block diagram of an apparatus for transmitting a physical layer protocol data unit according to an embodiment of this application.

The following describes in detail the apparatus for transmitting a physical layer protocol data unit provided in this embodiment of this application with reference to FIG. 6 to FIG. 8.

FIG. 6 is a schematic block diagram of an apparatus for transmitting a physical layer protocol data unit according to an embodiment of this application. As shown in FIG. 6, the apparatus 600 may include a communications unit 610 and a processing unit 620. The communications unit 610 may communicate with the outside, and the processing unit 620 is configured to process data. The communications unit 610 may also be referred to as a communications interface or a transceiver unit.

In a possible design, the apparatus 600 may implement the steps or procedures performed by the transmit end in the foregoing method embodiments. The processing unit 620 is configured to perform an operation related to processing of the transmit end in the foregoing method embodiments. The communications unit 610 is configured to perform an operation related to sending and receiving of the transmit end in the foregoing method embodiments.

For example, the processing unit 620 is configured to generate a physical layer protocol data unit PPDU, where the PPDU includes a long training field, a length of a frequency domain sequence of the long training field is greater than a first length, and the first length is a length of a frequency domain sequence of a long training field of a PPDU transmitted over a channel whose bandwidth is 160 MHz; and the communications unit 610 is configured to send the PPDU over a target channel, where a bandwidth of the target channel is greater than 160 MHz.

Optionally, the bandwidth of the target channel is 240 MHz, a transmission mode is a 4x mode, and the frequency domain sequence of the long training field is any one of the following: {HE-LTF80 MHz_4x, $0_{23}$, HE-LTF80 MHz_4x', $0_{23}$, −HE-LTF80 MHz_4x}; or {−HE-LTF80 MHz_4x, $0_{23}$, −HE-LTF80 MHz_4x', $0_{23}$, HE-LTF80 MHz_4x}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a method embodiment part.

Optionally, the bandwidth of the target channel is 320 MHz, a transmission mode is a 4x mode, and the frequency domain sequence of the long training field is any one of the following: {HE-LTF80 MHz_4x, $0_{23}$, −HE-LTF80 MHz_4x', $0_{23}$, HE-LTF80 MHz_4x, $0_{23}$, HE-LTF80 MHz_4x'}; or {−HE-LTF80 MHz_4x, $0_{23}$, HE-LTF80 MHz_4x', $0_{23}$, −HE-LTF80 MHz_4x, $0_{23}$, −HE-LTF80 MHz_4x'}; or {HE-LTF80 MHz_4x, $0_{23}$, HE-LTF80 MHz_4x', $0_{23}$, HE-LTF80 MHz_4x, $0_{23}$, −HE-LTF80 MHz_4x'}; or {−HE-LTF80 MHz_4x, $0_{23}$, −HE-LTF80 MHz_4x', $0_{23}$, −HE-LTF80 MHz_4x, $0_{23}$, HE-LTF80 MHz_4x'}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a method embodiment part.

Optionally, the bandwidth of the target channel is 240 MHz, a transmission mode is a 1x mode, and the frequency domain sequence of the long training field is {HE-LTF80 MHz_1x, $0_{23}$, HE-LTF80 MHz_1x, $0_{23}$, −HE-LTF80 MHz_1x}. For HE-LTF80 MHz_1x, refer to a method embodiment part. $0_{23}$ represents 23 consecutive 0s.

Optionally, the bandwidth of the target channel is 320 MHz, a transmission mode is a 1x mode, and the frequency domain sequence of the long training field is any one of the following: {HE-LTF80 MHz_1x, $0_{23}$, HE-LTF80 MHz_1x, $0_{23}$, HE-LTF80 MHz_1x, $0_{23}$, −HE-LTF80 MHz_1x}; or {−HE-LTF80 MHz_1x, $0_{23}$, −HE-LTF80 MHz_1x, $0_{23}$, −HE-LTF80 MHz_1x, $0_{23}$, HE-LTF80 MHz_1x}. For HE-LTF80 MHz_1x, refer to a method embodiment part. $0_{23}$ represents 23 consecutive 0s.

Optionally, the bandwidth of the target channel is 240 MHz, a transmission mode is a 2x mode, and the frequency domain sequence of the long training field is any one of the following: {HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}; or {−HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a method embodiment part.

Optionally, the bandwidth of the target channel is 240 MHz, a transmission mode is a 2x mode, and the frequency domain sequence of the long training field is any one of the following: {HE-LTF80 MHz_2x, $0_{23}$, −HE-LTF160 MHz_2x}; or {−HE-LTF80 MHz_2x, $0_{23}$, HE-LTF160 MHz_2x}; or {HE-LTF160 MHz_2x, $0_{23}$, −HE-LTF80 MHz_2x}; or {−HE-LTF160 MHz_2x, $0_{23}$, HE-LTF80 MHz_2x}; or {HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, −HE-LTF80 MHz_2x}. $0_{23}$ represents 23 consecutive 0s. For HE-LTF80 MHz_2x and HE-LTF160 MHz_2x, refer to a method embodiment part.

Optionally, the bandwidth of the target channel is 320 MHz, a transmission mode is a 2x mode, and the frequency domain sequence of the long training field is any one of the following: {HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$}; or {−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a method embodiment part.

Optionally, the bandwidth of the target channel is 320 MHz, a transmission mode is a 2x mode, and the frequency domain sequence of the long training field is any one of the following: {HE-LTF160 MHz_2x, $0_{23}$, −HE-LTF160 MHz_2x}; or {−HE-LTF160 MHz_2x, $0_{23}$, HE-LTF160 MHz_2x}; or {HE-LTF160 MHz_2x, $0_{23}$, HE-LTF160 MHz_2x}; or {−HE-LTF160 MHz_2x, $0_{23}$, −HE-LTF160 MHz_2x}; or {HE-LTF80 MHz_2x, $0_{23}$, −HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, HE-LTF80 MHz_2x, $0_{23}$, −HE-LTF80 MHz_2x}; or {HE-LTF80 MHz_2x, $0_{23}$, HE-LTF80 MHz_2x, $0_{23}$, −HE-LTF80 MHz_2x, $0_{23}$, −HE-LTF80 MHz_2x}; or {−HE-LTF80 MHz_2x, $0_{23}$, −HE-LTF80 MHz_2x, $0_{23}$, HE-LTF80 MHz_2x, $0_{23}$, HE-LTF80 MHz_2x}. $0_{23}$ represents 23 consecutive 0s. For HE-LTF80 MHz_2x and HE-LTF160 MHz_2x, refer to a method embodiment part.

In another possible design, the apparatus 600 may implement the steps or procedures performed by the receive end in the foregoing method embodiments. The communications unit 610 is configured to perform an operation related to sending and receiving of the receive end in the foregoing method embodiments. The processing unit 620 is configured to perform an operation related to processing of the receive end in the foregoing method embodiments.

For example, the communications unit 610 is configured to receive a physical layer protocol data unit PPDU over a target channel, where the PPDU includes a long training field, a length of a frequency domain sequence of the long training field is greater than a first length, the first length is a length of a frequency domain sequence of a long training field of a PPDU transmitted over a channel whose bandwidth is 160 MHz, and a bandwidth of the target channel is greater than 160 MHz; and the processing unit 620 is configured to parse the PPDU.

Optionally, the bandwidth of the target channel is 240 MHz, a transmission mode is a 4x mode, and the frequency domain sequence of the long training field is any one of the following: {HE-LTF80 MHz_4x, $0_{23}$, HE-LTF80 MHz_4x', $0_{23}$, −HE-LTF80 MHz_4x}; or {−HE-LTF80 MHz_4x, $0_{23}$, −HE-LTF80 MHz_4x', $0_{23}$, HE-LTF80 MHz_4x}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a method embodiment part.

Optionally, the bandwidth of the target channel is 320 MHz, a transmission mode is a 4x mode, and the frequency domain sequence of the long training field is any one of the following: {HE-LTF80 MHz_4x, $0_{23}$, −HE-LTF80 MHz_4x', $0_{23}$, HE-LTF80 MHz_4x, $0_{23}$, HE-LTF80 MHz_4x'}; or {−HE-LTF80 MHz_4x, $0_{23}$, HE-LTF80 MHz_4x', $0_{23}$, −HE-LTF80 MHz_4x, $0_{23}$, −HE-LTF80 MHz_4x'}; or {HE-LTF80 MHz_4x, $0_{23}$, HE-LTF80 MHz_4x', $0_{23}$, HE-LTF80 MHz_4x, $0_{23}$, −HE-LTF80 MHz_4x'}; or {−HE-LTF80 MHz_4x, $0_{23}$, −HE-LTF80 MHz_4x', $0_{23}$, −HE-LTF80 MHz_4x, $0_{23}$, HE-LTF80 MHz_4x'}; where HE-LTF80 MHz_4x={HE-LTF80 MHz_left_4x, 0, HE-LTF80 MHz_right_4x}, HE-LTF80 MHz_4x'={HE-LTF80 MHz_left_4x, 0, −HE-LTF80 MHz_right_4x}, and $0_{23}$ represents 23 consecutive 0s. For HE-LTF80 MHz_left_4x and HE-LTF80 MHz_right_4x, refer to a method embodiment part.

Optionally, the bandwidth of the target channel is 240 MHz, a transmission mode is a 1x mode, and the frequency domain sequence of the long training field is {HE-LTF80 MHz_1x, $0_{23}$, HE-LTF80 MHz_1x, $0_{23}$, −HE-LTF80 MHz_1x}. For HE-LTF80 MHz_1x, refer to a method embodiment part. $0_{23}$ represents 23 consecutive 0s.

Optionally, the bandwidth of the target channel is 320 MHz, a transmission mode is a 1x mode, and the frequency domain sequence of the long training field is any one of the following: {HE-LTF80 MHz_1x, $0_{23}$, HE-LTF80 MHz_1x, $0_{23}$, HE-LTF80 MHz_1x, $0_{23}$, −HE-LTF80 MHz_1x}; or {−HE-LTF80 MHz_1x, $0_{23}$, −HE-LTF80 MHz_1x, $0_{23}$, −HE-LTF80 MHz_1x, $0_{23}$, HE-LTF80 MHz_1x}. For HE-LTF80 MHz_1x, refer to a method embodiment part. $0_{23}$ represents 23 consecutive 0s.

Optionally, the bandwidth of the target channel is 240 MHz, a transmission mode is a 2x mode, and the frequency domain sequence of the long training field is any one of the following: {HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, HE-LTF$_{80\ MHz_part2_2x}$, HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, −HE-LTF$_{80\ MHz_part5_2x}$}; or {−HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a method embodiment part.

Optionally, the bandwidth of the target channel is 240 MHz, a transmission mode is a 2x mode, and the frequency domain sequence of the long training field is any one of the following: {HE-LTF80 MHz_2x, $0_{23}$, −HE-LTF160 MHz_2x}; or {−HE-LTF80 MHz_2x, $0_{23}$, HE-LTF160 MHz_2x}; or {HE-LTF160 MHz_2x, $0_{23}$, −HE-LTF80 MHz_2x}; or {−HE-LTF160 MHz_2x, $0_{23}$, HE-LTF80 MHz_2x}; or {HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, −HE-LTF80 MHz_2x}. $0_{23}$ represents 23 consecutive 0s. For HE-LTF80 MHz_2x and HE-LTF160 MHz_2x, refer to a method embodiment part.

Optionally, the bandwidth of the target channel is 320 MHz, a transmission mode is a 2x mode, and the frequency domain sequence of the long training field is any one of the following: {HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$, $0_{23}$, HE-LTF$_{80\ MHz_part1_2x}$, HE-LTF$_{80\ MHz_part2_2x}$, −HE-LTF$_{80\ MHz_part3_2x}$, −HE-LTF$_{80\ MHz_part4_2x}$, HE-LTF$_{80\ MHz_part5_2x}$}; or {−HE-LTF$_{80\ MHz_part1_2x}$, −HE-LTF$_{80\ MHz_part2_2x}$, −HE-LTF$_{80\ MHz_part3_2x}$, −HE-LTF$_{80\ MHz_part4_2x}$, −HE-LTF$_{80\ MHz_part5_2x}$, $0_{23}$, −HE-LTF$_{80\ MHz_part1_2x}$, −HE-LTF$_{80\ MHz_part2_2x}$, HE-LTF$_{80\ MHz_part3_2x}$, HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, HE-LTF$_{80\ MHz_part3_2x}$, −HE-LTF$_{80\ MHz_part4_2x}$, HE-LTF$_{80\ MHz_part5_2x}$, $0_{23}$, HE-LTF$_{80\ MHz_part1_2x}$, −HE-LTF$_{80\ MHz_part2_2x}$, −HE-LTF$_{80\ MHz_part3_2x}$, HE-LTF$_{80\ MHz_part4_2x}$, −HE-LTF$_{80\ MHz_part5_2x}$}. $0_{23}$ represents 23 consecutive 0s. For HE-LTF$_{80\ MHz_part1_2x}$, HE-LTF$_{80\ MHz_part2_2x}$, HE-LTF$_{80\ MHz_part3_2x}$, HE-LTF$_{80\ MHz_part4_2x}$, and HE-LTF$_{80\ MHz_part5_2x}$, refer to a method embodiment part.

Optionally, the bandwidth of the target channel is 320 MHz, a transmission mode is a 2x mode, and the frequency domain sequence of the long training field is any one of the following: {HE-LTF160 MHz_2x, $0_{23}$, −HE-LTF160 MHz_2x}; or {−HE-LTF160 MHz_2x, $0_{23}$, HE-LTF160 MHz_2x}; or {HE-LTF160 MHz_2x, $0_{23}$, HE-LTF160 MHz_2x}; or {−HE-LTF160 MHz_2x, $0_{23}$, −HE-LTF160 MHz_2x}; or {HE-LTF80 MHz_2x, $0_{23}$, −HE-LTF80 MHz_2x, $0_{23}$, −HE-LTF80 MHz_2x, $0_{23}$, HE-LTF80 MHz_2x}; or {−HE-LTF80 MHz_2x, $0_{23}$, HE-LTF80 MHz_2x, $0_{23}$, HE-LTF80 MHz_2x, $0_{23}$, −HE-LTF80 MHz_2x}; or {HE-LTF80 MHz_2x, $0_{23}$, HE-LTF80 MHz_2x, $0_{23}$, −HE-LTF80 MHz_2x, $0_{23}$, −HE-LTF80 MHz_2x}; or {−HE-LTF80 MHz_2x, $0_{23}$, −HE-LTF80 MHz_2x, $0_{23}$, HE-LTF80 MHz_2x, $0_{23}$, HE-LTF80

MHz_2x}. $0_{23}$ represents 23 consecutive 0s. For HE-LTF80 MHz_2x and HE-LTF160 MHz_2x, refer to a method embodiment part.

It should be understood that, the apparatus 600 herein is presented in a form of a functional unit. The term "unit" herein may indicate an application-specific integrated circuit (application specific integrated circuit, ASIC), an electronic circuit, a processor (for example, a shared processor, a dedicated processor, or a group processor) for executing one or more software or firmware programs and a memory, a merging logical circuit, and/or another suitable component supporting the described functions. In an optional example, a person skilled in the art may understand that, the apparatus 600 may be specifically the transmit end in the foregoing embodiments, and may be configured to perform the procedures and/or steps corresponding to the transmit end in the foregoing method embodiments. Alternatively, the apparatus 600 may be specifically the receive end in the foregoing embodiments, and may be configured to perform the procedures and/or steps corresponding to the receive end in the foregoing method embodiments. To avoid repetition, details are not described herein again.

The apparatus 600 in each of the foregoing solutions has a function of implementing the corresponding steps performed by the transmit end in the foregoing method, or the apparatus 600 in each of the foregoing solutions has a function of implementing the corresponding steps performed by the receive end in the foregoing method. The function may be implemented by hardware, or may be implemented by hardware by executing corresponding software. The hardware or software includes one or more modules corresponding to the foregoing functions. For example, the communications unit may be replaced by a transceiver (for example, a sending unit in the communications unit may be replaced by a transmitter, and a receiving unit in the communications unit may be replaced by a receiver), and another unit such as the processing unit may be replaced by a processor, so as to separately perform a sending and receiving operation and a related processing operation in each method embodiment.

In addition, alternatively, the communications unit may be a transceiver circuit (for example, may include a receiving circuit and a sending circuit), and the processing unit may be a processing circuit. In this embodiment of this application, the apparatus in FIG. 6 may be the receive end or the transmit end in the foregoing embodiments, or may be a chip or a chip system, for example, a system on chip (SoC). The communications unit may be an input/output circuit or a communications interface. The processing unit is a processor, a microprocessor, or an integrated circuit integrated on the chip. This is not limited herein.

FIG. 7 shows an apparatus 700 for transmitting a physical layer protocol data unit according to an embodiment of this application. The apparatus 700 includes a processor 710 and a transceiver 720. The processor 710 and the transceiver 720 communicate with each other through an internal connection path, and the processor 710 is configured to execute instructions, to control the transceiver 720 to send a signal and/or receive a signal.

Optionally, the apparatus 700 may further include a memory 730. The memory 730 communicates with the processor 710 and the transceiver 720 through an internal connection path. The memory 730 is configured to store instructions, and the processor 710 may execute the instructions stored in the memory 730. In a possible implementation, the apparatus 700 is configured to implement the procedures and steps corresponding to the transmit end in the foregoing method embodiments. In another possible implementation, the apparatus 700 is configured to implement the procedures and steps corresponding to the receive end in the foregoing method embodiments.

It should be understood that, the apparatus 700 may be specifically the transmit end or the receive end in the foregoing embodiments, or may be a chip or a chip system. Correspondingly, the transceiver 720 may be a transceiver circuit of the chip. This is not limited herein. Specifically, the apparatus 700 may be configured to perform the steps and/or procedures corresponding to the transmit end or the receive end in the foregoing method embodiments. Optionally, the memory 730 may include a read-only memory and a random access memory, and provide an instruction and data for the processor. A part of the memory may further include a non-volatile random access memory. For example, the memory may further store information about a device type. The processor 710 may be configured to execute the instruction stored in the memory, and when the processor 710 executes the instruction stored in the memory, the processor 710 is configured to perform each step and/or procedure of the method embodiment corresponding to the terminal.

In an implementation process, the steps in the foregoing methods may be implemented by using a hardware integrated logic circuit in the processor, or by using instructions in a form of software. The steps of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor in the embodiments of this application may implement or perform the methods, the steps, and the logical block diagrams that are disclosed in the embodiments of this application. The general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and methods described in this specification include but are not limited to these memories and any memory of another suitable type.

FIG. 8 shows an apparatus 800 for transmitting a physical layer protocol data unit according to an embodiment of this application. The apparatus 800 includes a processing circuit 810 and a transceiver circuit 820. The processing circuit 810 and the transceiver circuit 820 communicate with each other by using an internal connection path. The processing circuit 810 is configured to execute instructions to control the transceiver circuit 820 to send a signal and/or receive a signal.

Optionally, the apparatus 800 may further include a storage medium 830. The storage medium 830 communicates with the processing circuit 810 and the transceiver circuit 820 by using an internal connection path. The storage medium 830 is configured to store instructions, and the processing circuit 810 may execute the instructions stored in the storage medium 830. In a possible implementation, the apparatus 800 is configured to implement the procedures and steps corresponding to the transmit end in the foregoing method embodiments. In another possible implementation, the apparatus 800 is configured to implement the procedures and steps corresponding to the receive end in the foregoing method embodiments.

According to the methods provided in embodiments of this application, this application further provides a computer program product, and the computer program product includes computer program code. When the computer program code is run on a computer, the computer is enabled to perform the method in the embodiment shown in FIG. 5.

According to the methods provided in embodiments of this application, this application further provides a computer-readable medium. The computer-readable medium stores program code. When the program code is run on a computer, the computer is enabled to perform the method in the embodiment shown in FIG. 5.

According to the methods provided in the embodiments of this application, this application further provides a system, including the foregoing one or more stations and the foregoing one or more access points.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

generating a physical layer protocol data unit (PPDU), wherein the PPDU comprises a long training field, a length of a frequency domain sequence of the long training field is greater than a first length, and the first length is a length of a frequency domain sequence of a long training field that is transmitted over a channel whose bandwidth is 160 MHz; and sending the PPDU over a target channel, wherein a bandwidth of the target channel is greater than 160 MHz, wherein the bandwidth of the target channel is 320 MHz, a transmission mode for sending the PPDU is a 1x mode, and the frequency domain sequence of the long training field is:

{a*HE-LTF80 MHz_1x, $0_{23}$, b*HE-LTF80 MHz_1x, $0_{23}$, C*HE-LTF80 MHz_1x, $0_{23}$, d*HE-LTF80 MHz_1x}, wherein a is +1 or −1, b is +1 or −1, c is +1 or −1, d is +1 or −1, and $0_{23}$ represents 23 consecutive zeros (0), and wherein HE-LTF80 MHz_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

2. A method comprising:

receiving a physical layer protocol data unit (PPDU) over a target channel, wherein the PPDU comprises a long training field, a length of a frequency domain sequence of the long training field is greater than a first length, the first length is a length of a frequency domain sequence of a long training field that is transmitted over a channel whose bandwidth is 160 MHz, and a bandwidth of the target channel is greater than 160 MHz;

parsing the PPDU to obtain the frequency domain sequence of the long training field; and estimating the target channel based on the frequency domain sequence of the long training field and a defined frequency domain sequence of a long training field, wherein the bandwidth of the target channel is 320 MHz, a transmission mode of the PPDU is a 1x mode, and the defined frequency domain sequence of the long training field is:

{a*HE-LTF80 MHz_1x, $0_{23}$, b*HE-LTF80 MHz_1x, $0_{23}$, C*HE-LTF80 MHz_1x, $0_{23}$, d*HE-LTF80 MHz_1x}, wherein a is +1 or −1, b is +1 or −1, c is +1 or −1, d is +1 or −1, $0_{23}$ represents 23 consecutive zeros (0), and wherein HE-LTF80 MHz_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

3. An apparatus comprising:

a processor, configured to generate a physical layer protocol data unit (PPDU), wherein the PPDU comprises a long training field, a length of a frequency domain sequence of the long training field is greater than a first length, and the first length is a length of a frequency domain sequence of a long training field that is transmitted over a channel whose bandwidth is 160 MHz; and a transceiver, configured to send the PPDU over a target channel, wherein a bandwidth of the target channel is greater than 160 MHz, wherein the bandwidth of the target channel is 320 MHz, a transmission mode for sending the PPDU is a 1x mode, and the frequency domain sequence of the long training field is:

{a*HE-LTF80 MHz_1x, $0_{23}$, b*HE-LTF80 MHz_1x, $0_{23}$. C*HE-LTF80 MHz_1x, $0_{23}$, d*HE-LTF80 MHz_1x}, wherein a is +1 or −1, b is +1 or −1, c is +1 or −1, d is +1 or −1, and $0_{23}$ represents 23 consecutive zeros (0), and wherein HE-LTF80 MHz_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

4. An apparatus comprising:

a transceiver, configured to receive a physical layer protocol data unit (PPDU) over a target channel, wherein the PPDU comprises a long training field, a length of a frequency domain sequence of the long training field is greater than a first length, the first length is a length of a frequency domain sequence of a long training field that is transmitted over a channel whose bandwidth is 160 MHz, and a bandwidth of the target channel is greater than 160 MHz; and a processor, configured to:

parse the PPDU to obtain the frequency domain sequence of the long training field; and estimate the target channel based on the frequency domain sequence of the long training field and a defined frequency domain sequence of a long training field, wherein the bandwidth of the target channel is 320 MHz, a transmission mode of the PPDU is a 1x mode, and the defined frequency domain sequence of the long training field is:

{a*HE-LTF80 MHz_1x, $0_{23}$, b*HE-LTF80 MHz_1x, $0_{23}$, C*HE-LTF80 MHz_1x, $0_{23}$, d*HE-LTF80 MHz_1x}, wherein a is +1 or −1, b is +1 or −1, c is +1 or −1, d is +1 or −1, $0_{23}$ represents 23 consecutive zeros (0), and wherein HE-LTF80 MHz_1x={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

* * * * *

UNITED STATES PATENT AND TRADEMARK OFFICE

CERTIFICATE OF CORRECTION

PATENT NO. : 12,348,440 B2
APPLICATION NO. : 17/744133
DATED : July 1, 2025
INVENTOR(S) : Liang et al.

It is certified that error appears in the above-identified patent and that said Letters Patent is hereby corrected as shown below:

In the Claims

In Column 57, in Claim 1, Line 20, delete “C*” and insert -- c* --.

In Column 58, in Claim 2, Line 30, delete “C*” and insert -- c* --.

In Column 59, in Claim 3, Lines 36-37, delete “$0_{23}$. C*” and insert -- $0_{23}$, c* --.

In Column 60, in Claim 4, Line 49, delete “C*” and insert -- c* --.

Signed and Sealed this
Nineteenth Day of August, 2025

Coke Morgan Stewart
*Acting Director of the United States Patent and Trademark Office*